US006775728B2

(12) United States Patent
Zimmer et al.

(10) Patent No.: US 6,775,728 B2
(45) Date of Patent: Aug. 10, 2004

(54) METHOD AND SYSTEM FOR CONCURRENT HANDLER EXECUTION IN AN SMI AND PMI-BASED DISPATCH-EXECUTION FRAMEWORK

(75) Inventors: Vincent J. Zimmer, Federal Way, WA (US); Sham M. Datta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 456 days.

(21) Appl. No.: 10/011,233

(22) Filed: Nov. 15, 2001

(65) Prior Publication Data

US 2003/0093579 A1 May 15, 2003

(51) Int. Cl.$^7$ .............................. G06F 13/24; G06F 9/00
(52) U.S. Cl. .......................... 710/260; 710/261; 713/1; 713/2
(58) Field of Search ................................ 710/260, 261, 710/262, 263, 264; 713/1, 2

(56) References Cited

U.S. PATENT DOCUMENTS

| 5,437,039 | A | | 7/1995 | Yuen |
| 5,560,019 | A | | 9/1996 | Narad |
| 6,212,587 | B1 | * | 4/2001 | Emerson et al. ............ 710/107 |
| 6,453,278 | B1 | * | 9/2002 | Favor et al. ................. 703/27 |
| 2001/0016892 | A1 | | 8/2001 | Klein |

FOREIGN PATENT DOCUMENTS

WO   PCT/US02/36765     11/2002

OTHER PUBLICATIONS

David A. Rusling, "Interrupts and Interrupt Handling", The Linux Kernel, pp. 75–79, Chapter 7, Internet, Online, XP002232996, Retrieved from the Internet: URL:http://www.tldp.org/guides.html retrieved on Feb. 27, 2003, section 7.2, "Initializing the Interrupt Handing Data Structures", section 7.3, "Interrupt Handling".

Giroir D. et al., "Interrupt Dispatching Method for Multiprocessing System", IBM Technical Disclosure Bulletin, Sep. 1984, USA, vol. 27, No. 4B, pp. 2356–2359, XP002232995, ISSN: 0018–8689.

Anonymous, "The Peripheral Component Interconnect (PCI) Bus and vxWorks", Online, Apr. 1998 XP002232997, Retrieved from the Internet: URL:ece–www.colorado.edu/{ecen5633/vxworks_pci.pdf, retrieved on Feb. 27, 2003, pp. 49–2, section, PCI Interrupt Handling.

International Search Report, Mar. 10, 2003.

* cited by examiner

*Primary Examiner*—Tim Vo
(74) *Attorney, Agent, or Firm*—Blakely, Sokoloff, Taylor & Zafman LLP

(57) ABSTRACT

A method and system that enables concurrent event handler execution in a system management interrupt (SMI) and processor management interrupt (PMI)-based dispatch-execution framework to service an SMI or PMI event. A plurality of event handlers are loaded into a hidden memory space that is accessible to a hidden execution mode supported by each of a plurality of processors in a multiprocessor computer system but is not accessible to other operating modes of those processors. The event handlers are then dispatched to two or more processors in response to the hidden execution mode event and concurrently executed to service the event. Various embodiments include use of a single event handler to service the event, multiple event handlers that perform different tasks, and multiple event handler instances that concurrently perform a single task. The invention also provides a resource locking mechanism to prevent resource access conflicts.

34 Claims, 16 Drawing Sheets

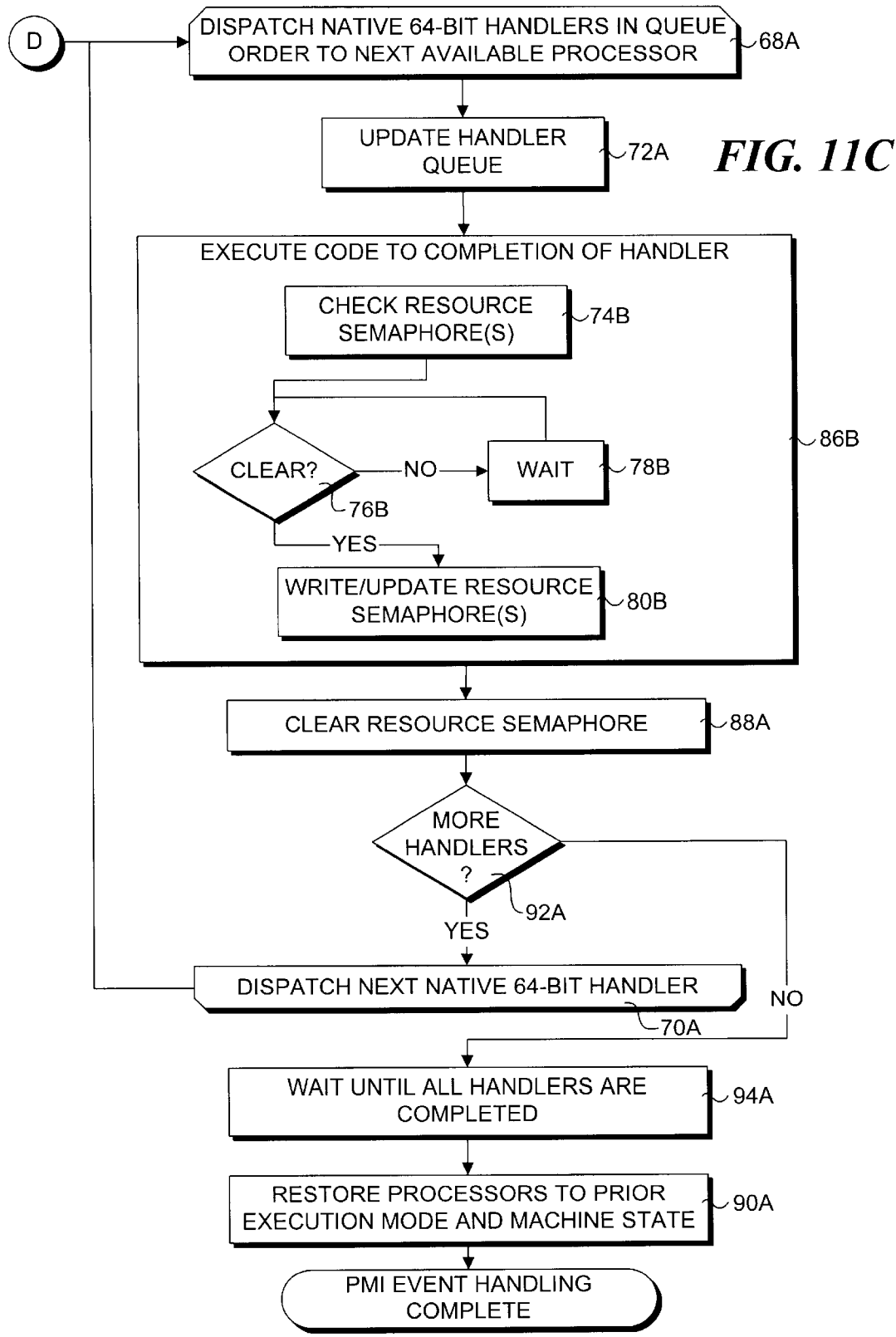

METHOD AND SYSTEM FOR CONCURRENT HANDLER EXECUTION IN AN SMI AND PMI-BASED DISPATCH-EXECUTION FRAMEWORK

BACKGROUND OF THE INVENTION

1. Field of the Invention

The present invention concerns computer systems in general, and a mechanism for extending the functionality of the System Management Mode (SMM) and other similar hidden execution modes of processors in particular.

2. Background Information

Since the 386SL processor was introduced by the Intel Corporation, SMM has been available on IA32 processors as an execution mode hidden to operating systems that executes code loaded by BIOS or firmware. SMM is a special-purpose operating mode provided for handling system-wide functions like power management, system hardware control, or proprietary OEM-designed code. The execution mode is deemed "hidden" because the operating system (OS) and software applications cannot see it, or even access it.

IA32 processors are enabled to enter SMM via activation of an SMI (System Management Interrupt) signal. A similar signal called the PMI (Processor Management Interrupt) signal that is roughly analogous to the SMI signal is used for Itanium™-class processors. For simplicity, both SMI and PMI signals are sometimes referred to as xMI signals herein. There is also an interrupt message type called "SMI" or "PMI" that use the APIC/XAPIC IA32 memory-mapped delivery mechanism or the IPF SAPIC delivery mechanism.

To date, most BIOS implementations that leverage the SMM capability of the foregoing Intel processors simply register a monolithic section of code that is created during the build of the BIOS to support a specific function or set of functions particular to systems that use the BIOS. This code comprises 16-bit assembly in IA32 and 64-bit assembly for Itanium processors. The monolithic code segments for these legacy implementations runs from beginning to completion in response to all xMI activations.

There is no provision in today's systems for the registration or execution of third-party SMM code, thus allowing no extensibility to the SMM framework. Such extensibility is often desired. For example, if the functions provided by the SMM code provided by the original equipment manufacturer (OEM) or the BIOS vendor for a given platform is insufficient, a developer or value-added reseller (VAR) has to either license the existing code from the BIOS vendor or OEM and attempt to graft their own logic into their implementation of SMM code, or live with the insufficiency, since the present SMM framework does not provide an alternative way to modify or extend the functions provided by the monolithic code segment. In addition, today's implementations on IA32 processors are restricted to the 16-bit mode of the processor, thus limiting the size of the code and the possible leveraging of 32-bit or 64-bit software engineering techniques. Also, in that SMM is often used for chipset work-arounds (e.g., CPU or chipset errata that produces an erroneous and/or unpredictable result due to a design or manufacturing flaw in the chipset or CPU), the ability to get this key software update is gated by the monolithic BIOS implementation of the BIOS vendor or OEM.

In today's environment, most chipset vendors opt for having the operating system vendor integrate such work-arounds using an OS-driver. In general, BIOS updates for SMM functions are problematic to effect and since the OS already has a hardware extensibility mechanism via its own driver model, BIOS vendors and OEMs are less motivated to provide these types of BIOS updates.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11C comprises a second portion of the flowchart of FIG. 11A illustrating the logic used by the invention in accordance with an embodiment in which a plurality of event handlers are dispatched to multiple processors and executed to completion to service the PMI event.

DETAILED DESCRIPTION OF THE ILLUSTRATED EMBODIMENTS

Figure 1:
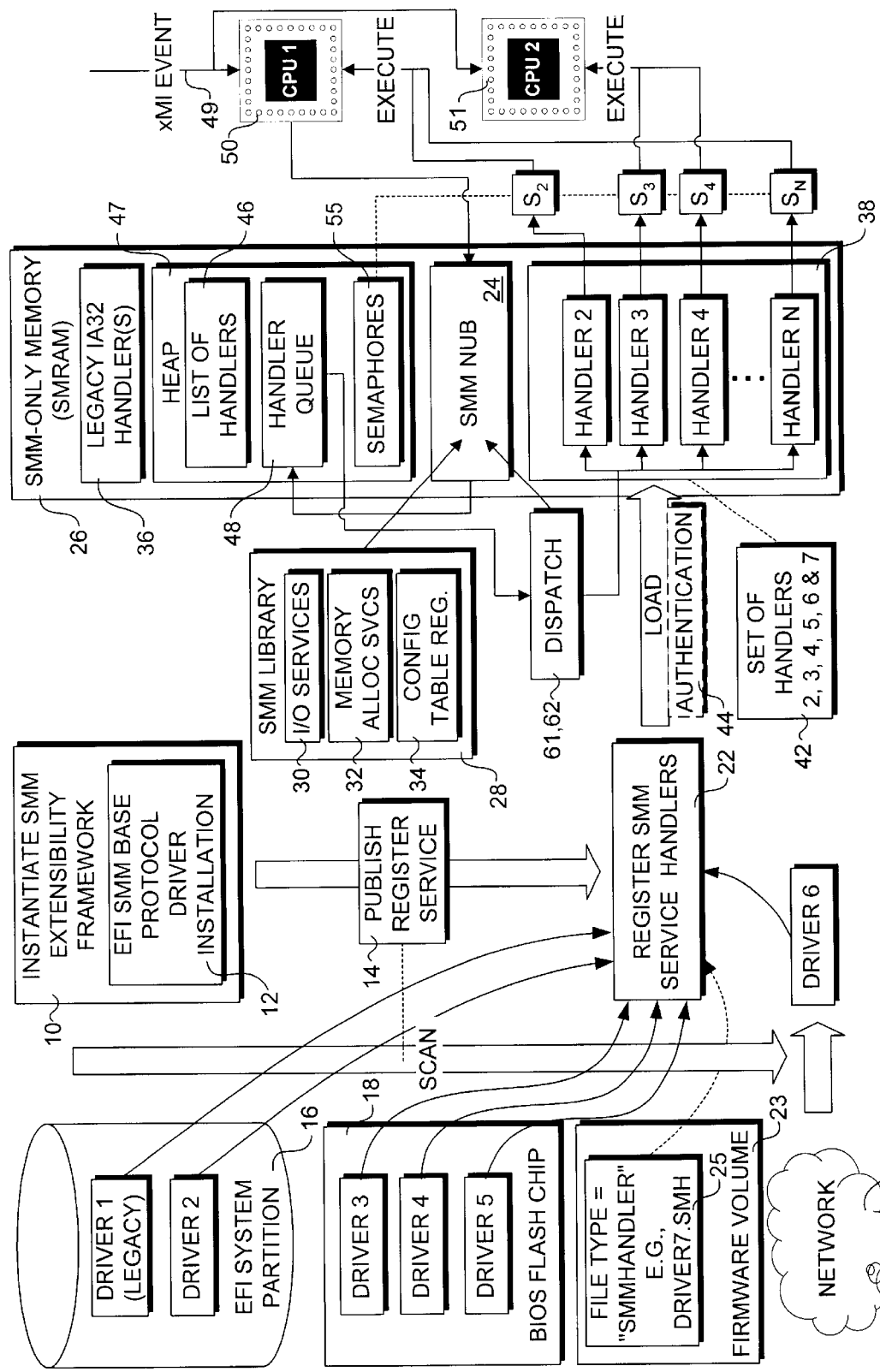
FIG. 1 is a schematic diagram illustrating an exemplary implementation of the present invention that enables various event handlers to be loaded into a hidden memory space and concurrently executed in response to a system management interrupt (SMI) or processor management interrupt (PMI) (collectively, xMI) event.

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a mechanism that enables executable content in the form of a plurality of software drivers to be loaded into the System Management Mode (SMM) of an Intel 32-bit family of microprocessor (i.e., IA-32 processors), or the native mode of an Itanium-based processor with a PMI signal activation, and concurrently executed on multiprocessor computer systems that employ IA-32 and Itanium-based processors. The state of execution of code in IA32 SMM is initiated by an SMI signal and that in Itanium™ processors is initiated by a PMI signal activation; for simplicity, these will generally be referred to as SMM. The mechanism allows for multiple drivers, possibly written by different parties, to be installed for SMM operation. An agent that registers the drivers runs in the EFI (Extensible Firmware Interface) boot-services mode (i.e., the mode prior to operating system launch) and is composed of a CPU-specific component that binds the drivers and a platform component that abstracts chipset control of the xMI (PMI or SMI) signals. The API's (application program interfaces) providing these sets of functionality are referred to as the SMM Base and SMM Access Protocol, respectively.

In conventional SMM implementations, SMM space is often locked by the platform software/firmware/BIOS via hardware mechanisms before handing off control; this grants firmware the ability to abstract the control and security of this binding. In contrast, the software abstraction via the SMM Access protocol provided by the invention obviates the need of users of this facility to know and understand the exact hardware mechanism, thus allowing drivers to be portable across many platforms.

As provided in further detail below, the present invention includes the following features: a library in SMM for the drivers' usage, including an I/O access abstraction and memory allocation services; a means to communicate with drivers and applications executing in non-SMM mode; an optional parameter for periodic activation at a given frequency; a means to authenticate the drivers on load into SMM; the ability to close the registration capability; the ability to run in a multi-processor environment where many processors receive the xMI activation; and finally, the capability to run legacy IA32 SMM code as a distinguished registered event handler. A characteristic of the system is that all event handlers run in the native processor mode of Itanium™ or in the case of IA32, the framework will put the processor into flat 32 mode prior to invoking the event handlers, while running the optional legacy IA32 handler(s) in real-mode (i.e., 16-bit mode).

A high-level view of an exemplary implementation of the invention is depicted in FIG. 1. The implementation is enabled through use of the EFI framework, which defines a new model for the interface between operating systems and platform firmware. The interface consists of data tables that contain platform-related information, plus boot and runtime service calls that are available to the operating system and its loader. Together, these provide a standard environment for booting an operating system and running pre-boot applications.

The process for producing the SMM extensibility framework is initiated in a block 10, wherein The SMM extensibility framework is instantiated. This includes installing an EFI SMM base protocol driver in a block 12. The EFI SMM base protocol, SMM_BASE, is a CPU-specific protocol that is published by the CPU driver or another agency that can abstract the ISA-specific details of an IA32 or Itanium processor. Once installed, SMM_BASE publishes an SMM handler register service in a block 14. Publication of the handler register service enables legacy and add-on drivers that are stored on various storage devices, including an EFI system partition 16, a BIOS flash chip 18 and on a storage device accessed via a network 20 to register SMM event handlers in a block 22. In addition to these types of storage devices, the drivers may be stored on other persistent storage devices that are accessible to the computer system in which the invention is implemented, including motherboard-based ROMs, option-ROMs contained on add-on peripheral cards, local hard disks and CD ROMs, which are collectively depicted by a firmware volume 23. (It is noted that EFI system partition 16, BIOS flash chip 18 and the remote storage device on which driver 6 resides also may comprise firmware volumes.) As depicted in FIG. 1, these drivers include a legacy driver 1 and an add-on driver 2 stored in EFI system partition 16, add-on drivers 3, 4, and 5, which are stored on BIOS flash chip 18, and an add-on driver 6 that is accessed from a remote storage device (e.g., file server) via network 20. As used herein, the term "add-on" corresponds to drivers and firmware files that were not provided with the original firmware of the computer system as provided by the original equipment manufacture (OEM) of that system.

In an optional mode, the EFI SMM base protocol driver may scan various firmware volumes to identify any drivers that are designated for servicing xMI events via SMM. In one embodiment, these drivers are identified by their file type, such as exemplified by a "DRIVER7.SMH" file 25 corresponding to an add-on driver 7.

During the installation of the EFI SMM base protocol driver, an SMM Nub 24 is loaded into SMRAM 26, which comprises an SMM-only memory space. As explained in further detail below, SMM Nub 24 is responsible for coordinating all activities while control is transferred to SMM, including providing an SMM library 28 to event handlers that includes PCI and I/O services 30, memory allocation services 32, and configuration table registration 34.

Registration of an SMM event handler is the first step in enabling the handler to perform a particular xMI event servicing function it is designed to perform. An SMM event handler comprises a set of code (i.e., coded machine instructions) that when executed by a system processor (CPU) performs an event service function in a manner similar to an interrupt service routine. Typically, each SMM event handler will contain code to service a particular hardware component or subsystem, or a particular class of hardware. For example, SMM event handlers may be provided for servicing errors cause by the system's real time clock, I/O port errors, PCI device errors, etc. In general, there may be some correspondence between a given driver and an SMM event handler. However, this is not a strict requirement, as the handlers may comprise a set of functional blocks extracted from a single driver file or object.

When the event handler for legacy driver 1 is registered, it is loaded into SMRAM 26 as a legacy handler 36. A legacy handler is an event handler that is generally provided with the original system firmware and represents the conventional mechanism for handling an xMI event. As each add-on SMM event handler is registered in block 22, it is loaded into an add-on SMM event handler portion 38 of SMRAM 26; once all of add-on event handlers are loaded, add-on SMM event handler portion 28 comprises a set of event handlers corresponding to add-on drivers 2–7, as depicted by a block 42. In addition, as each SMM event handler is registered, it may optionally be authenticated in a block 44 to ensure that the event handler is valid for use with the particular processor and/or firmware for the computer system. For example, an encryption method that implements a digital signature and public key may be used. As SMM event handlers are registered, they are added to a list of handlers 46 stored in a heap 47 maintained by SMM Nub 24.

Once all of the legacy and add-on SMM event handlers have been registered and loaded into SMRAM 26 and proper configuration data (metadata) is written to SMM Nub 24, the SMRAM is locked, precluding registration of additional SMM event handlers. The list of handlers is also copied to a handler queue 48, which may be stored in heap 47 and accessed by SMM Nub 24 or stored directly in SMM Nub 24. The system is now ready to handle various xMI events via SMM.

Figure 2A:
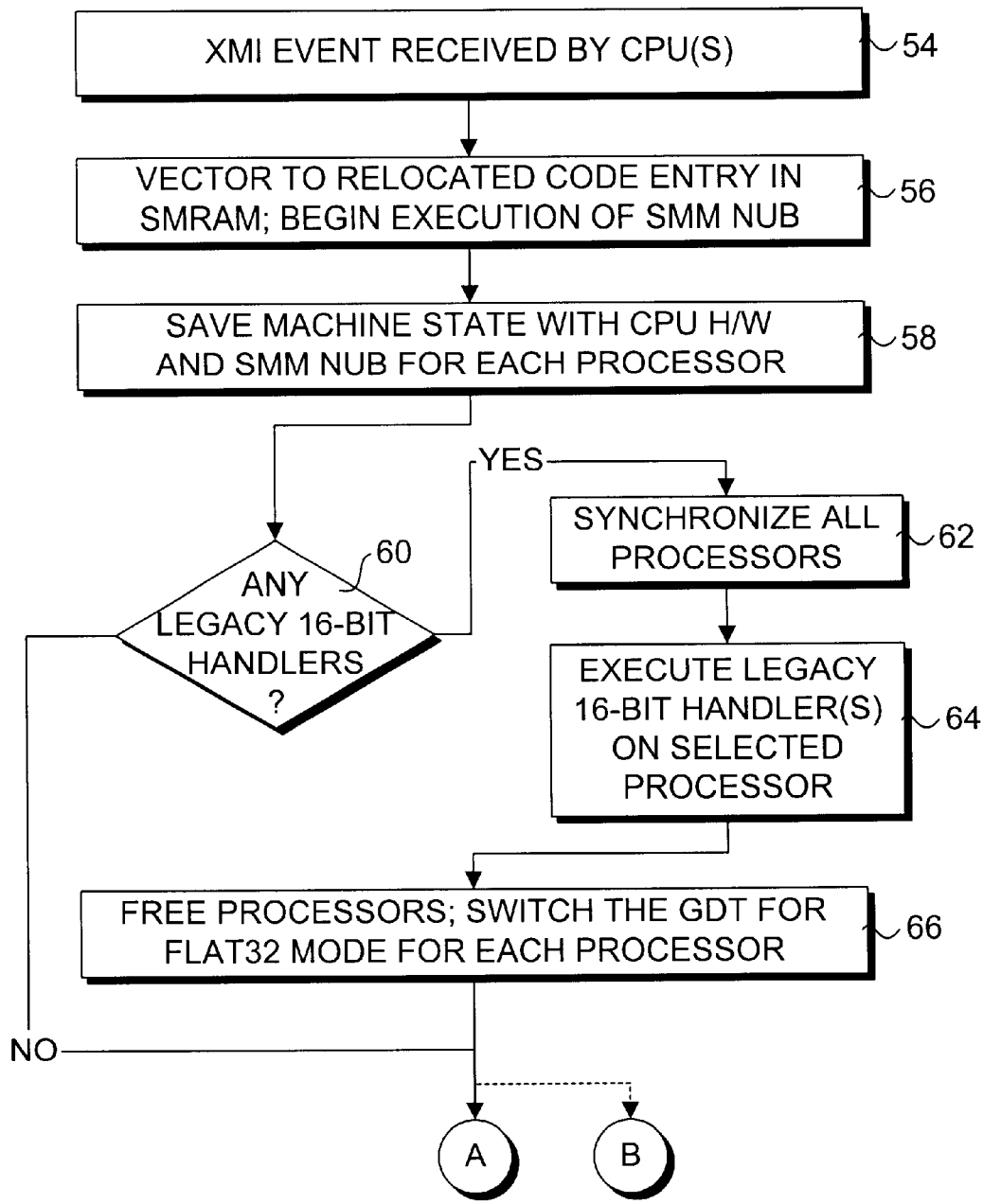
FIG. 2A comprises a first portion of a flowchart illustrating the logic used by the present invention when handling an xMI event in accordance with the architecture of FIG. 1.
Figure 2B:
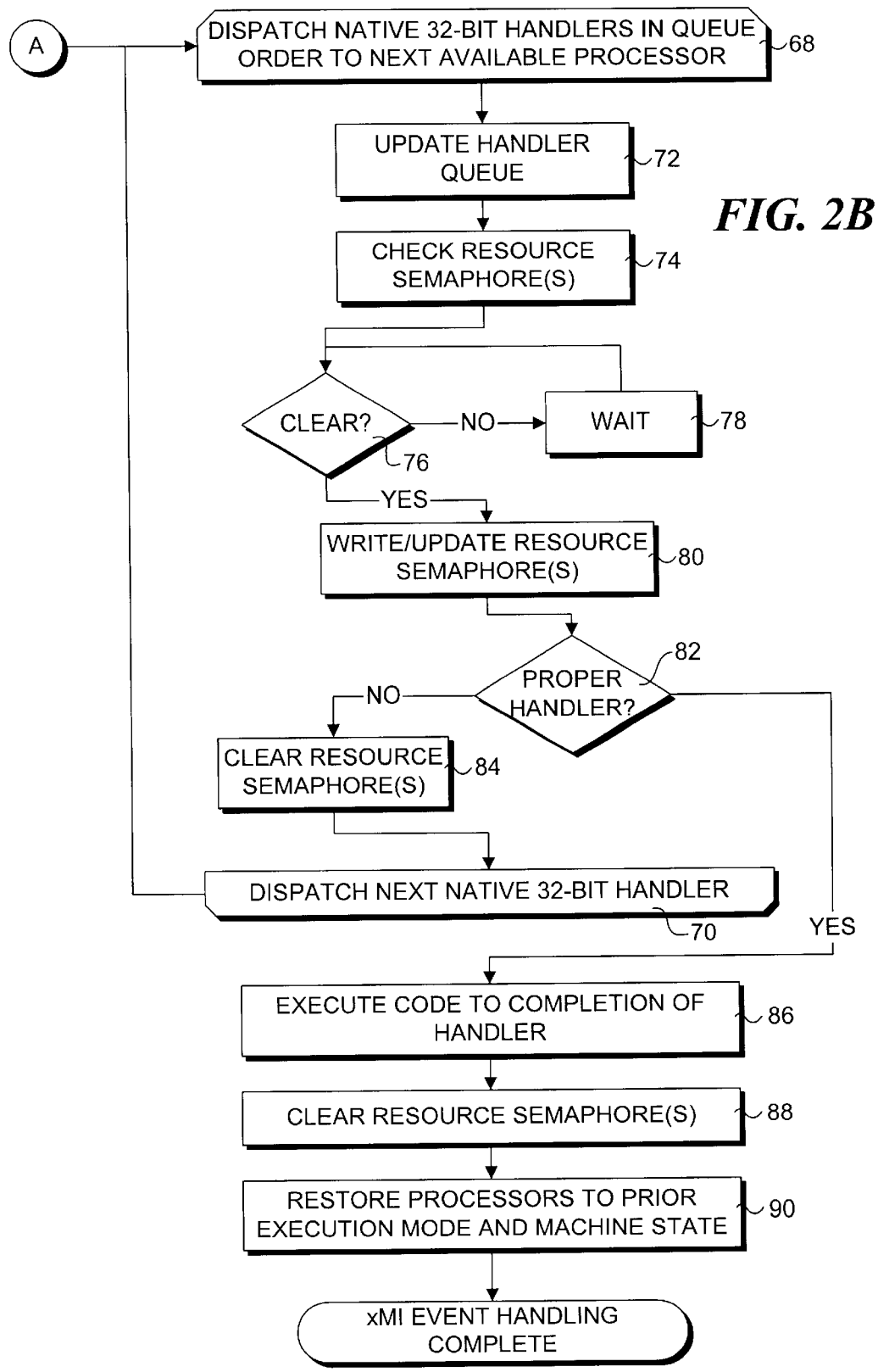
FIG. 2B comprises a second portion of the flowchart of FIG. 2A illustrating the logic used by the invention in accordance with an embodiment in which a plurality of event handlers are dispatched to multiple processors and checked to see if they are appropriate for handling the xMI event.

With reference to FIGS. 1, 2A and 2B, the process for handling an xMI event with an IA32 processor in accordance with a first embodiment of the invention proceeds as follows: In a block 54, an xMI event signal 49 is received by all of the processors in a multiprocessor system, as exemplified by a processor 50 (CPU 1) and a processor 51 (CPU 2) in the illustrated embodiment. In general, for IA32 processors, an xMI (SMI) event may be generated in response to activation of a pin on the system chipset, bus cycle type, or inter-processor interrupt (IPI) that cause an IA32 processor to enter SMM. For Itanium™ processors, an xMI (PMI) event may be generated in response to activation of a pin on the system chipset, bus cycle type, or an IPI that causes an Itanium™ processor to return to Physical Mode and execute code registered with the PAL (Processor Abstraction layer) for servicing PMI events.

In response to the xMI event, processor 50 switches to SMM mode and redirects the instruction pointer to the first instruction in SMM Nub 24, wherein the SMM Nub begins executing, as provided by a block 56. The machine state for each processor is then saved in a block 58 through operations performed by each processor's built-in hardware register handling and control operations performed by the SMM Nub.

Next, in a decision block 60, a determination is made to whether there are any legacy 16-bit handlers that have been registered and loaded. If the answer is yes, all of the processors are synchronized in a block 62, whereby all but a selected processor (e.g., the first processor that is identified during the system's pre-boot process) are halted while the 16-bit handler(s) is/are executed by the selected processor in a block 64. For convenience, it will be assumed that processor 50 is the selected processor in this example. Accordingly, any 16-bit handlers would be executed by processor 50, while any other processors (e.g., processor 51) would be halted during execution of these 16-bit handlers. The halted processors are then freed in a block 66, and their machine execution modes are switched to a Flat32 protected mode. This protected mode comprises a flat 32-bit mode with non-paged 32-bit, zero-based addressing.

Once the execution mode switch has been completed, native 32-bit handlers are dispatched in their order stored in handler queue 48 to the next available processor, until an appropriate event handler is executed to completion to service the xMI event, as provided by start loop and end loop blocks 68 and 70 in FIG. 2B. In one embodiment, the event handlers are stored as a linked list that is traversed in order from top to bottom, wherein a first event handler is dispatched to a first processor and additional event handlers are dispatched to a next available processor until an appropriate event handler has been executed on one of the system's processors. A handler can be marked to be "Single-processor" if it wishes to execute exclusively; this is the case for legacy code or a module optimized for a uni-processor desktop. In this latter case, all other processors will be held in a wait service until the "Single-Processor" handler completes execution. As the native 32-bit handlers are dispatched, handler queue 48 is updated in a block 72, which includes incrementing the position of a next-to-dispatch pointer and identifying which processor the event handler is dispatched to.

Each event handler contains a early portion of code that is used to determine if that handler is the proper handler for servicing the xMI event. A typical determination of this sort comprises interrogating the hardware component, subsystem, etc. corresponding to the event handler to see if an error has occurred for that object. In some instances, there is a possibility that more than one processor could execute handler code that attempts to access the same resource concurrently during execution of this initial code portion or other code portions of the native event handlers. For example, many devices, including both built-in peripheral and driver components (e.g., sound chips, video chips, network interface chips, etc) and add-on peripherals (e.g., sound cards, video cards, network interface cards, etc.) operate under the PCI (Peripheral Component Interface) architecture. Under this architecture, a PCI device may be interrogated by send a request string that includes information pertaining to the device and the register that holds the data the interrogation concerns to the PCI CF8h I/O (input/output) port. A typical request string will have the format "Bus/Device/Function/Register," wherein "Bus" specifies the enumerated PCI bus the device is connected to, "/Device" specifies the enumerated device # assigned to the device during PCI initialization, "/Function" specifies a PCI function performed by the device, and "/Register" specifies a register that stores information, such as error codes, pertaining to the device that might be of interest to the event handler submitting the request. To check for various PCI requests, the PCI controller "listens" for request submitted to the CF8h I/O port. Accordingly, upon submission of such a request to the PCI controller, the PCI controller and/or devices will check to see if the request concerns those devices. Devices for which the request does not concern simply ignore the request. In contrast, the device specified by "/Device" portion of the string will respond by copying the value specified by the "/Function/Register" register to the PCI CFCh I/O port, which enables the interrogation code of the handler to read the value stored in the specified register.

One potential problem with this conventional PCI device query scheme would occur if a first processor submitted a request at about the same time as a second processor and the data written to the CFC I/O port pertained to the wrong request. In order to prevent this, the invention employs a resource locking scheme in which semaphores 55 are used to ensure that a given resource or set of resources (e.g., I/O port or set of I/O ports, memory ranges, etc.) can only be accessed by only one event handler at a time.

In general, this resource locking scheme involves storing semaphore data that tracks resource usage (e.g., I/O ports, memory), and checking this data prior to executing handler code portions that access such resources, wherein execution of such code portions are delayed until the semaphore(s) corresponding to the resources are cleared (indicating the resources are available for use). Accordingly, resource semaphore(s) 55 corresponding to the dispatched event handler are checked in a block 74 to verify access to relevant I/O ports used by those event handlers is available. As provided by a decision block 76, if the result of the check is FALSE (NO), the event handler performs a predefined wait in a block 78, and the logic loops back to decision block 76. This wait/check process is repeated until the result of the resource semaphore(s) clear check is TRUE (YES).

Upon verifying that the resources corresponding to the resource semaphore(s) check are available, corresponding semaphore data is updated or written in a block 80, as depicted by semaphores $S_1$, $S_2$, $S_3$, and $S_N$ in FIG. 1. In effect, this "locks" the resource by indicating that it is not available for any other event handler to use. In accordance with a decision block 82, the code portion that determines whether the event handler is the proper event handler is then allowed to execute. If the code portion determines that the event handler is not the proper handler (i.e., it determines that its corresponding device did not cause the error), it returns a code to the SMM Nub indicating such, and the SMM Nub clears the I/O semaphore(s) that were written or updated above in block 80 in a block 84. The logic then proceeds to end loop block 70, whereupon it loops back to start loop block 68, wherein the SMM Nub dispatches the next handler in handler queue 48 to a next available processor and the foregoing operations are repeated for this event handler.

If the event handler is the appropriate handler to service the xMI event, the answer to decision block 82 is TRUE, and the logic proceeds to a block 86 in which the handler code is executed to completion, whereupon the handler code returns data to the processor it is running on that identifies whether or not the xMI event was successfully handled. Upon acknowledgment of the xMI event being handled, the SMM Nub clears the resource semaphore(s) corresponding to the handler (i.e., written or updated above in block 80) in a block 88, and restores the machine state and executes an appropriate instruction (RSM for IA32, Return on b0 into PAL PMI code) for all processors to return the processors to their previous execution mode in a block 90. This completes handling the xMI event. The core needs to ensure that all processors check-in and have returned from their handlers in order have a single point in the SMM Nub to return machine control to the various processors.

Prior to executing the handlers, the SMM Nub needs to save certain machine and platform resources prior to executing any handlers. These stores include the contents of registers such as PCI Configuration space address port 0CF8h in case the SMI or PMI occurred while foreground code was in the middle of a PCI configuration access to 0CF8h and 0CFCh. This is the same scenario with SIO configuration ports 22$h$/23$h$, RTC port 70$h$/71$h$, etc. A platform personality "State Save" Module shall be used to affect this end.

For the case of supporting legacy 16-bit handlers and 32-bit handlers on IA32, the SMM Nub shall go into protected mode prior to running the legacy handlers in order to save the math co-processor and floating-point state. It goes into protected mode first because more of the FP state is exposed in protected mode than in real mode.

It is noted that the timing of the resource semaphore checks shown in FIG. 2B and discussed above relative to the overall process are merely exemplary. In addition to I/O ports, semaphores may be used for any resource that might be shared by two or more event handlers. Furthermore, resource semaphore checks may be performed during operations other than those shown in FIG. 2B. For example, the use of semaphores might be applied to any I/O access portions of a given handler, wherein more than one semaphore check might be performed during execution of a single handler.

Figure 2C:
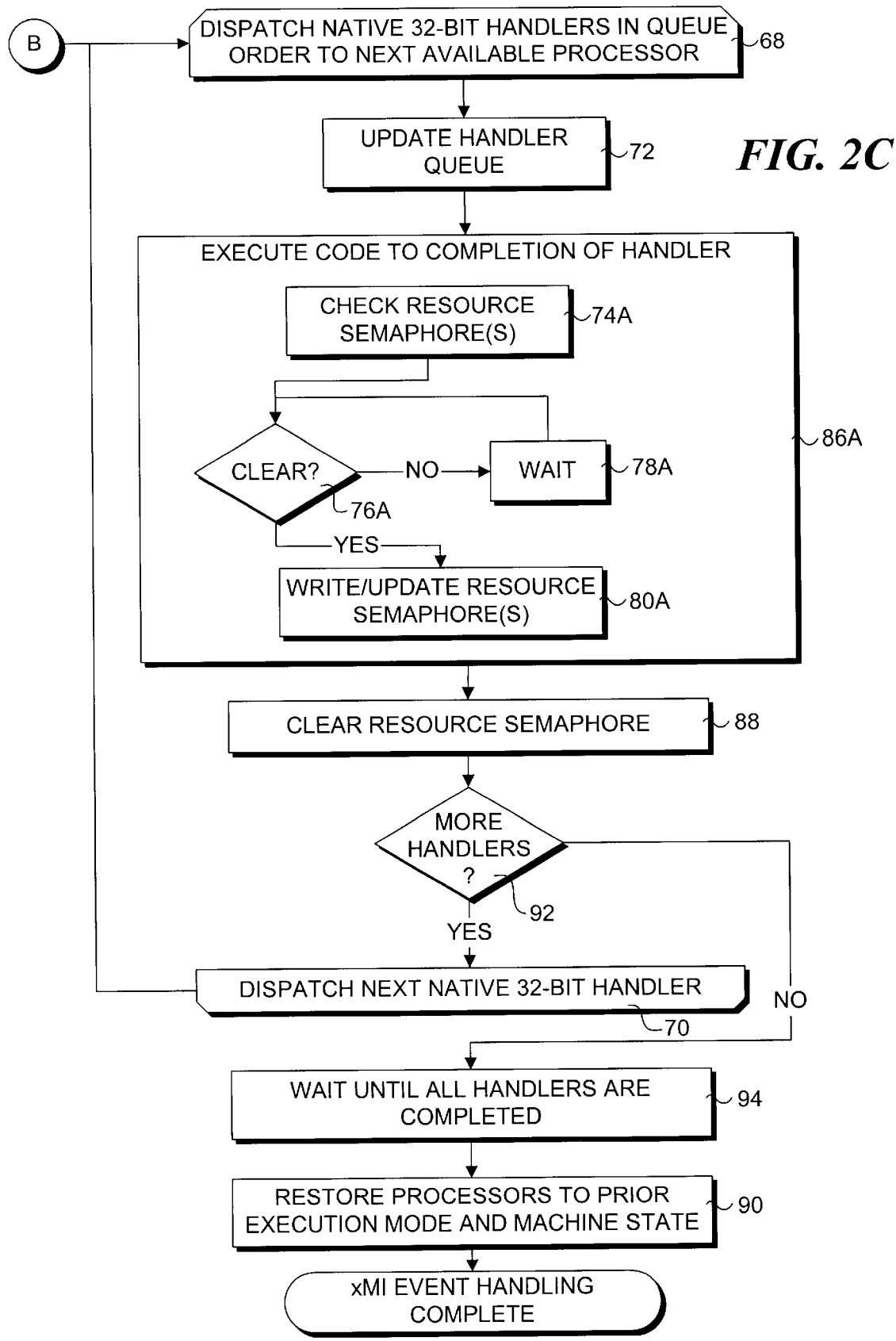
FIG. 2C comprises a second portion of the flowchart of FIG. 2A illustrating the logic used by the invention in accordance with an embodiment in which a plurality of event handlers are dispatched to multiple processors and executed to completion to service the xMI event.

In the foregoing embodiment, various event handlers were dispatched to a next available processor and an early portion of each handler was executed to determine if it was the appropriate handler for the xMI event. This was repeated until and appropriate event handler was identified, which was then allowed to continue to completion to service the event. In another embodiment, multiple event handlers may be executed to completion to perform a single service operation or a set of related operations pertaining to an xMI event. The logic for this framework is shown in FIGS. 2A and 2C, wherein the process portion of FIG. 2A is the same as that discussed above, and various operation blocks in FIG. 2C sharing the same reference number of corresponding blocks in FIG. 2B perform substantially similar operations. Accordingly, the details of these like-numbered blocks will not be discussed further.

Generally, each event handler will be dispatched based on its order in handler queue 48 in a manner similar to that described above. The handler is then executed to completion, as shown by a block 86A. In this instance, semaphore check, waits, and locks may be performed in a manner similar to that described above during execution of the event handler code, as provided by blocks 74A, 76A, 78A, and 80A. Once the handler code has completed executing, any corresponding resource semaphores are cleared in a block 88, and a determination is made in a decision block 92 to whether there are any more handlers to execute. If there are, they are dispatched in their queue order. Once all of the event handlers have been dispatched, the determination of decision block 92 will be TRUE, and the system will wait until all handlers have executed to completion in a block 94. The machine state and prior execution mode are then restored in a block 90, completing the xMI event handling process.

Figure 3:
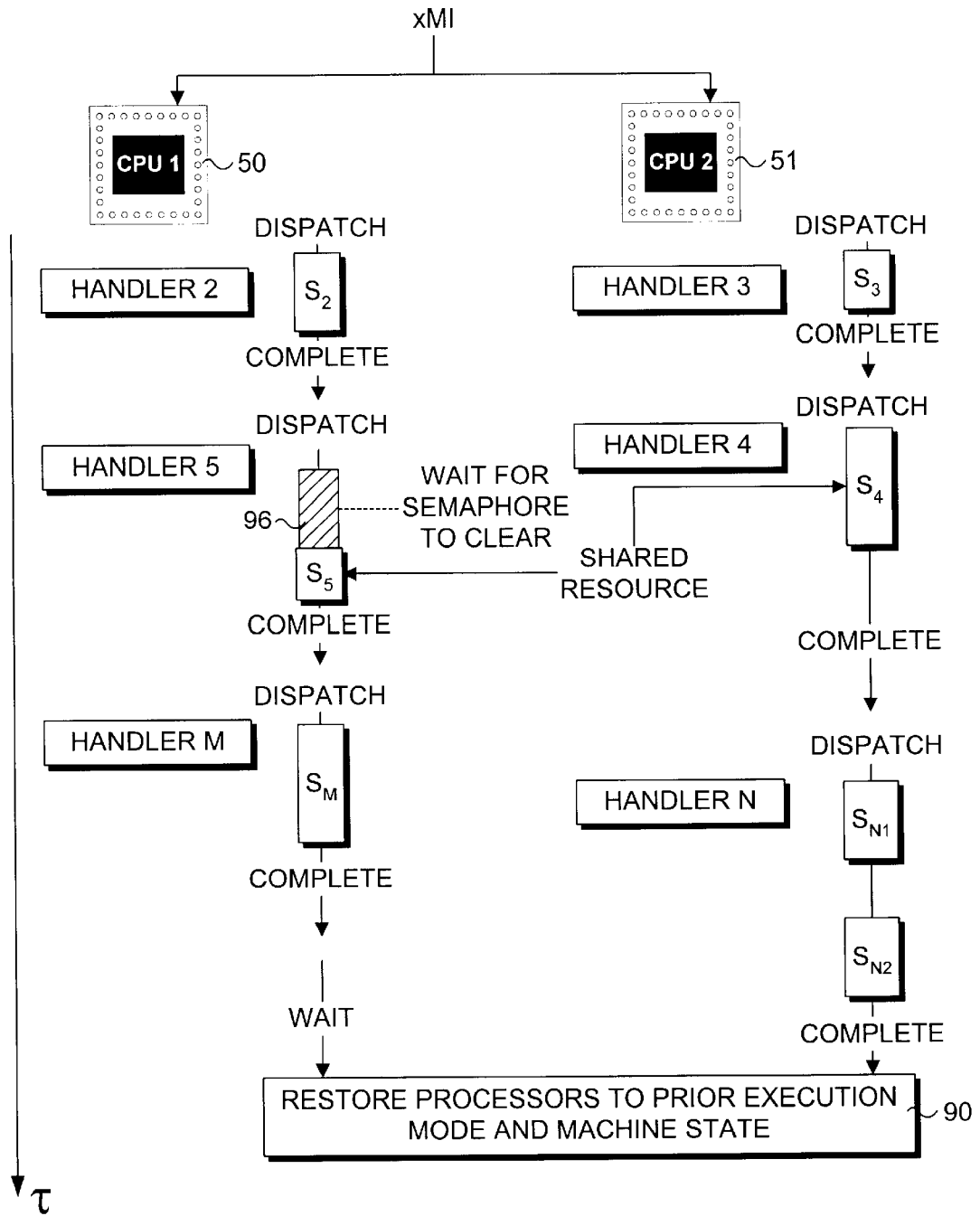
FIG. 3 is a schematic diagram illustrating a timeline corresponding to dispatch and execution of a plurality of event handlers in a two-processor computer system in accordance with the embodiment corresponding to the flowcharts of FIGS. 2A and 2C.

An exemplary handling of an xMI event in accordance with the present embodiment is depicted in FIG. 3. In response to an xMI event 49A, operations are performed using CPU's 50 and 51 corresponding to the flowchart portion of FIG. 2A, as before. The dispatching of handlers then begins, wherein handler 2 is dispatched to processor 50 and handler 3 is dispatched to processor 51. During execution of handler 2, a semaphore $S_2$ is created to lock resources used by the handler. Likewise, a semaphore $S_3$ is created to lock resources used by handler 3. Both handlers 2 and 3 are executed to completion, and their respective semaphores are cleared.

Upon completion of handler 3, handler 4 is dispatched to processor 51, which immediately creates a semaphore $S_4$. Shortly thereafter, handler 5 is dispatched to processor 50. Handler 5 needs access to a shared resource that is locked by semaphore $S_4$. Accordingly, handler 5 must wait for this resource to become available, as indicated by a wait segment 96. Upon completion of its use of the shared resource, handler 4 clears semaphore $S_4$, thereby releasing the corresponding resource for use by handler 5. Immediately thereafter, handler 5 creates a semaphore $S_5$ to lock the resource. Both handlers 4 and 5 continue to execute to completion, whereupon subsequent handlers are dispatched to the next available processor based on the handler order in handler queue 48.

Eventually, the last two handlers M and N are dispatched. In the case of handler N, the handler includes code portions that access different resources at different points in time. Accordingly, two semaphores are created, namely semaphores $S_{N1}$ and $S_{N2}$. Both handlers M and N continue execution until completion, with handler M completing first. Processor 50 then waits until handler N has completed executing, whereupon the processors are restored to the prior machine state and execution modes in a block 90.

Figure 4A:
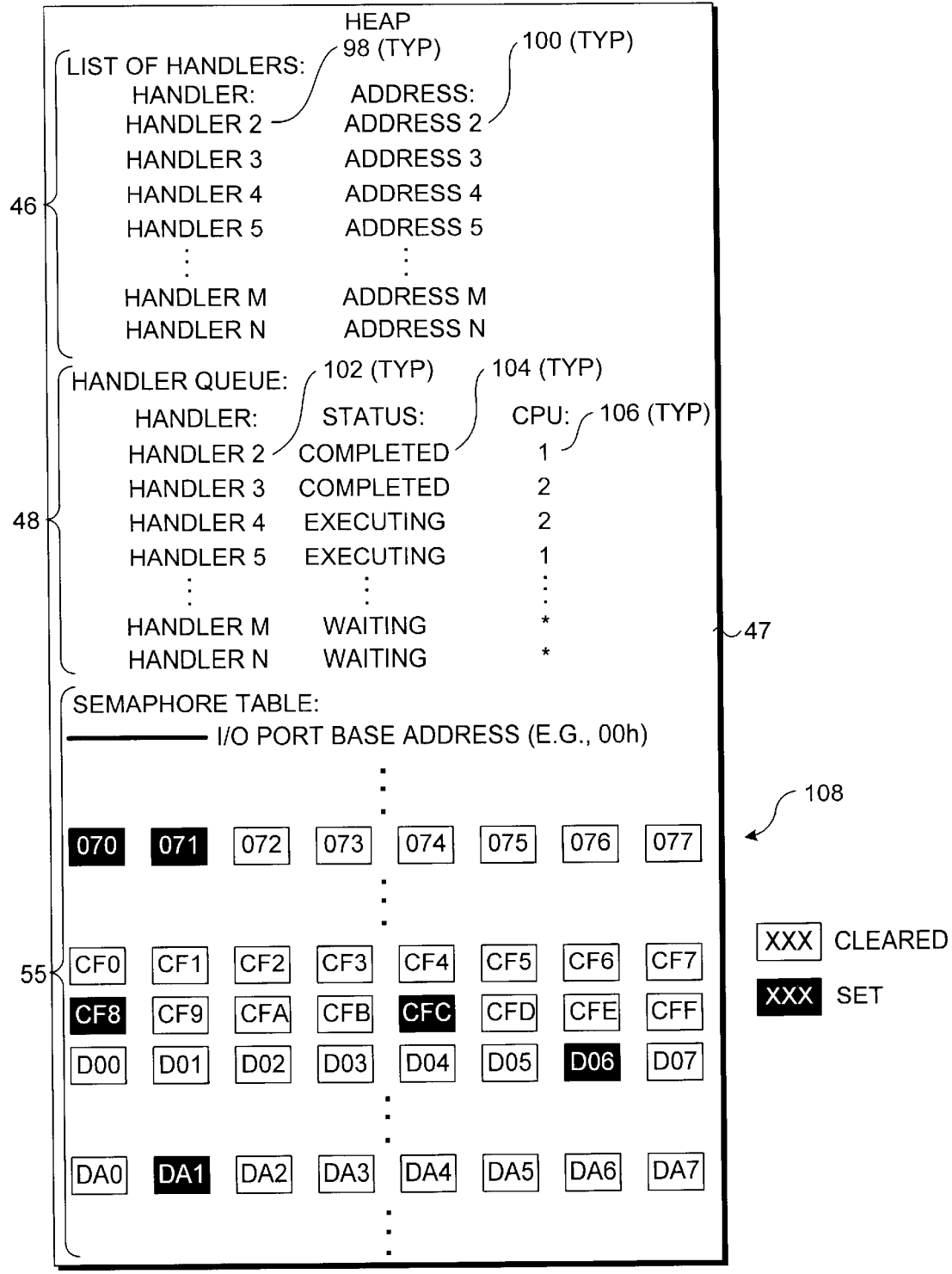
FIG. 4A is a schematic diagram illustrating a first exemplary set of data stored in a hidden memory space heap that is used during dispatch and execution of event handlers, including a semaphore table that is used for resource locking.

Exemplary data stored in heap 47 corresponding to the foregoing example are shown in FIG. 4A. Heap 47 will typically comprise a reserved portion of SMRAM 26. As discussed above, it will include data pertaining to a list of handlers 46, and handler queue 48, and semaphores 55. In the illustrated embodiment, the list of handlers includes a handler identifier 98 that is used to identifying each handler 98 and a corresponding starting address 100 that provides for the first instruction of the code for that handler. Handler queue 48 comprises a table that includes three columns: a handler identifier 102, a handler status 104, and a CPU identifier 106 that identifies what CPU the handler is executing or was executed on.

In general, semaphores 55 may be stored in a variety of data structures. Typically, a semaphore will comprise a resource-value pair from which a handler can determine whether a given resource is locked by another handler. In the embodiment illustrated in FIG. 4A, semaphores 55 include a semaphore table 108 that includes various I/O ports and their corresponding availabilities, which are marked using a Boolean semaphore comprising a "0" to indicate the resource is available (i.e., the semaphore is cleared), and a "1" to indicate the resource is locked. In one embodiment, a I/O port "bitmap" is used, wherein the bitmap comprises a sequence of 1-bit storage locations corresponding to respective I/O ports with each the identity of each I/O port being derived from a I/O port base address and an offset from that base address for which each respective bit corresponds. Set bits indicate corresponding resources are locked, while cleared bits indicate corresponding resources are free. Accordingly, semaphore table 108 indicates that I/O ports 70$h$, 71$h$, CF8h, CFCh, D06h, and DA1h are locked.

Figure 4B:
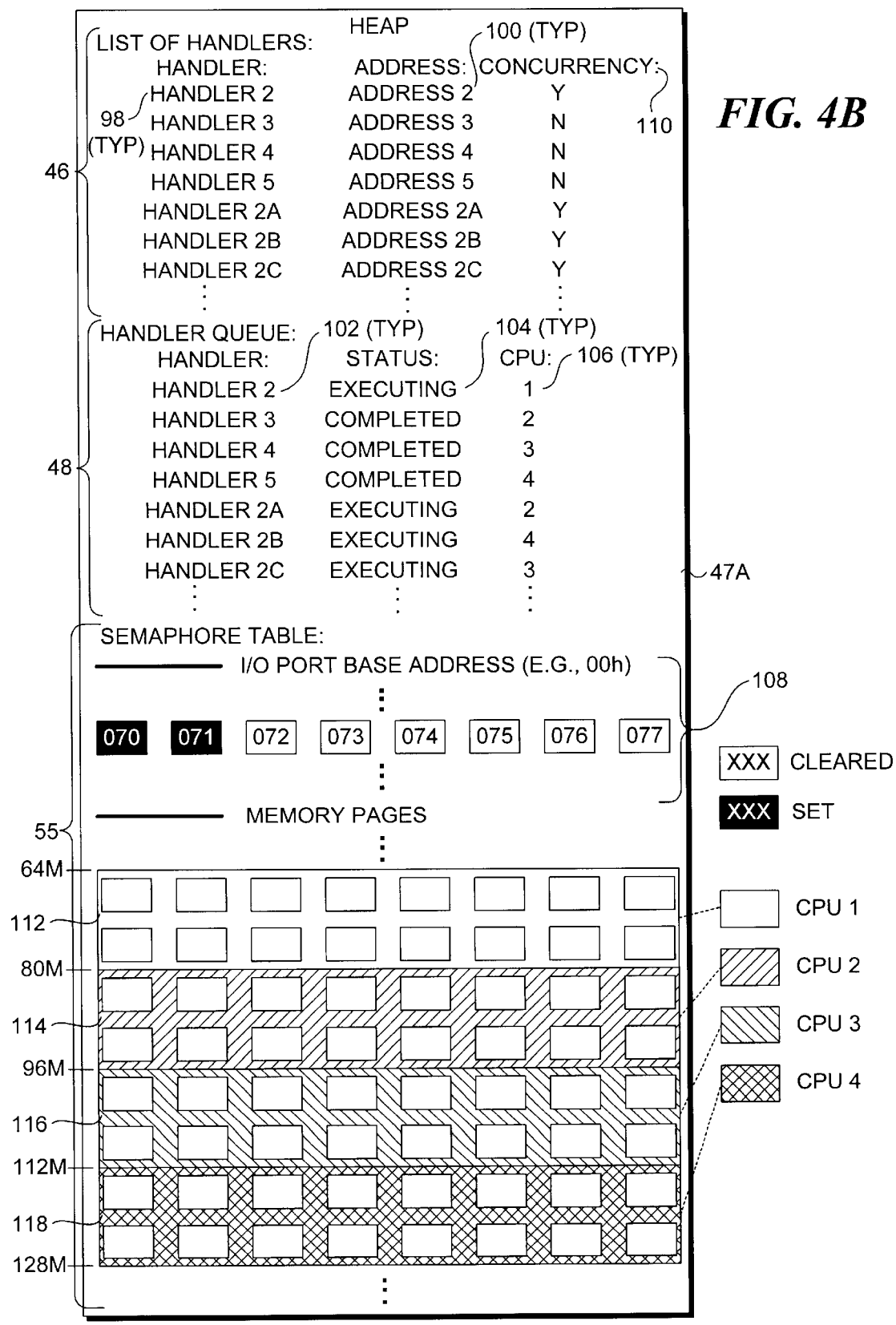
FIG. 4B is a schematic diagram illustrating a second exemplary set of data stored in the hidden memory space heap corresponding to a use case in which a plurality of handler instances are concurrently executed to service an error correction code (ECC) memory fault event.
Figure 5:
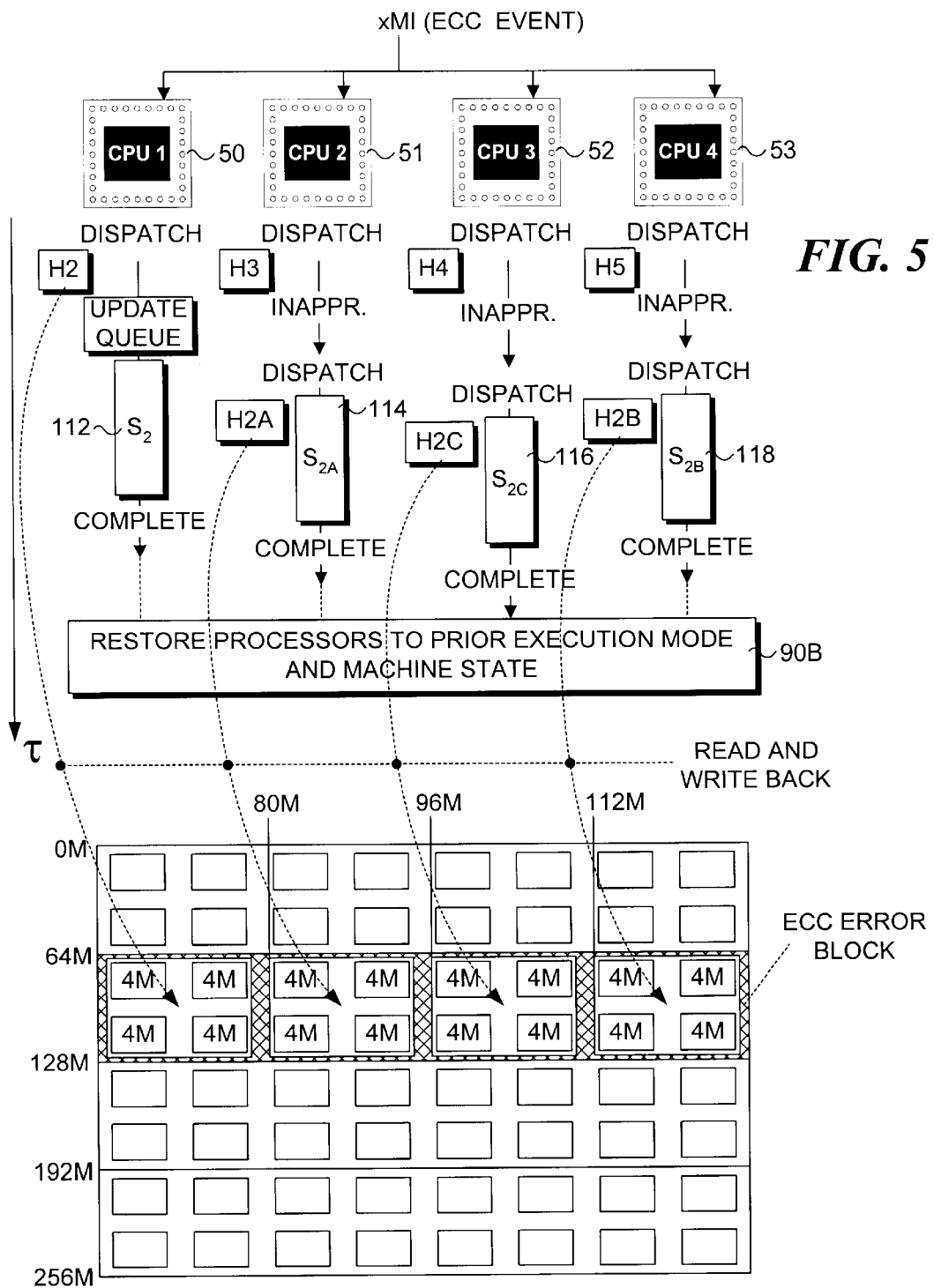
FIG. 5 is a schematic diagram illustrating a timeline corresponding to dispatch and execution of a plurality of event handlers and event handler instances used when concurrently servicing the ECC memory fault event.

In another embodiment, handlers (or code portions thereof) corresponding to resources that support concurrent access are dispatch to different processors and allowed to execute concurrently. A timeline corresponding to an exemplary use case of this embodiment is shown in FIG. 5, while corresponding data stored in a heap 47A are shown in FIG. 4B. In this example, an xMI signal corresponding to an error correction code (ECC) event is sent to each of four processors 50, 51, 52, and 53. The initial operations for handling the xMI event are performed in a similar manner to that discussed above with reference to FIG. 2A. Subsequently, a handler H2 is dispatched to processor 50, while handlers H3, H4, and H5 are dispatched to processors 51, 52, and 53, respectively. In this instance, it is assumed that handler H2 is an appropriate handler for handling the ECC event, while handlers H3, H4, and H5 are inappropriate handlers. Accordingly, early portions of these inappropriate handlers are allowed to execute and return information to SMM Nub 24 indicating they are inappropriate handlers for the event.

In one embodiment, a concurrency type column 110 is added to list of handlers 46 to indicate whether a handler can support concurrent execution. Optionally, this information can be determined by an early portion of the handler code. Based on one of the foregoing schemes, it is recognized that the resource supported by handler H2 (i.e., memory in the case of an ECC event handler) can support concurrent access. Accordingly, an early code portion of handler H2 updates list of handlers 46 and handler queue 48 such that the next code portions to be dispatched to processors 51, 52, and 53 are either additional instances of handler H2, or a core portion of handler H2 that services the ECC event. These handlers or handler core portions are depicted as handlers H2A, H2C, and H2D, which are dispatched to processors 51, 53, and 52, respectively, upon completion of handlers H3, H5, and H4.

ECC events are enunciated by system memory that provides error correction code support. Essentially, an ECC event is enunciated when the memory detects a potential error condition. In one embodiment, the response to such an event is to have a processor read data stored in one or more blocks of the memory identified by an ECC code and write back to these blocks of memory. In the present example, it will be assumed that the ECC capabilities of the memory are fairly coarse, whereby the memory can only detect an error for an entire DIMM (dual inline memory module), and wherein there are four 64 megabyte (M) DIMMs (256M total) installed in the system. Furthermore, it is assumed that the second DIMM, corresponding to memory blocks from 64M to 128M generated the ECC event.

In accordance with the foregoing scenario, handler H2 or code in SMM library 28 determines that since there is 64M of memory to correct (i.e., read and write back to in order to implement the "software-based" scrub of memory), and there are four processors to perform the task, each processor is assigned to correct 16M of memory. In one embodiment, resource locking data (e.g., semaphores) may be stored in semaphore table 55 to identify which memory blocks are assigned to which processor to correct, as shown in FIG. 4B. As illustrated in FIG. 4B, there are four sets of semaphores 112, 114, 116, and 118, each comprising data corresponding to 16 1M memory blocks, wherein each set of semaphores locks its corresponding memory blocks such that those blocks may only be accessed by the processor identified by the semaphores. For example, semaphores 112 lock memory blocks from 64M to 80M such that they may only be accessed by processor 50 (CPU 1), semaphores 114 lock memory blocks from 80M to 96M such that they may only be accessed by processor 51 (CPU 2), etc. In addition to the semaphore-based locking scheme shown, other resource locking schemes may be used, such as identifying ranges of memory locked by each processor.

Each of handlers or handler core portions H2, H2A, H2B, and H2C continue to execute until their corresponding memory blocks have been corrected. Upon completion of there respective handlers, each of processors 50, 51, 52, and 53 wait until any remaining handler code is executed, whereupon all of the processors are restored to their respective machine states and prior execution modes in a block 90B.

Figure 6:
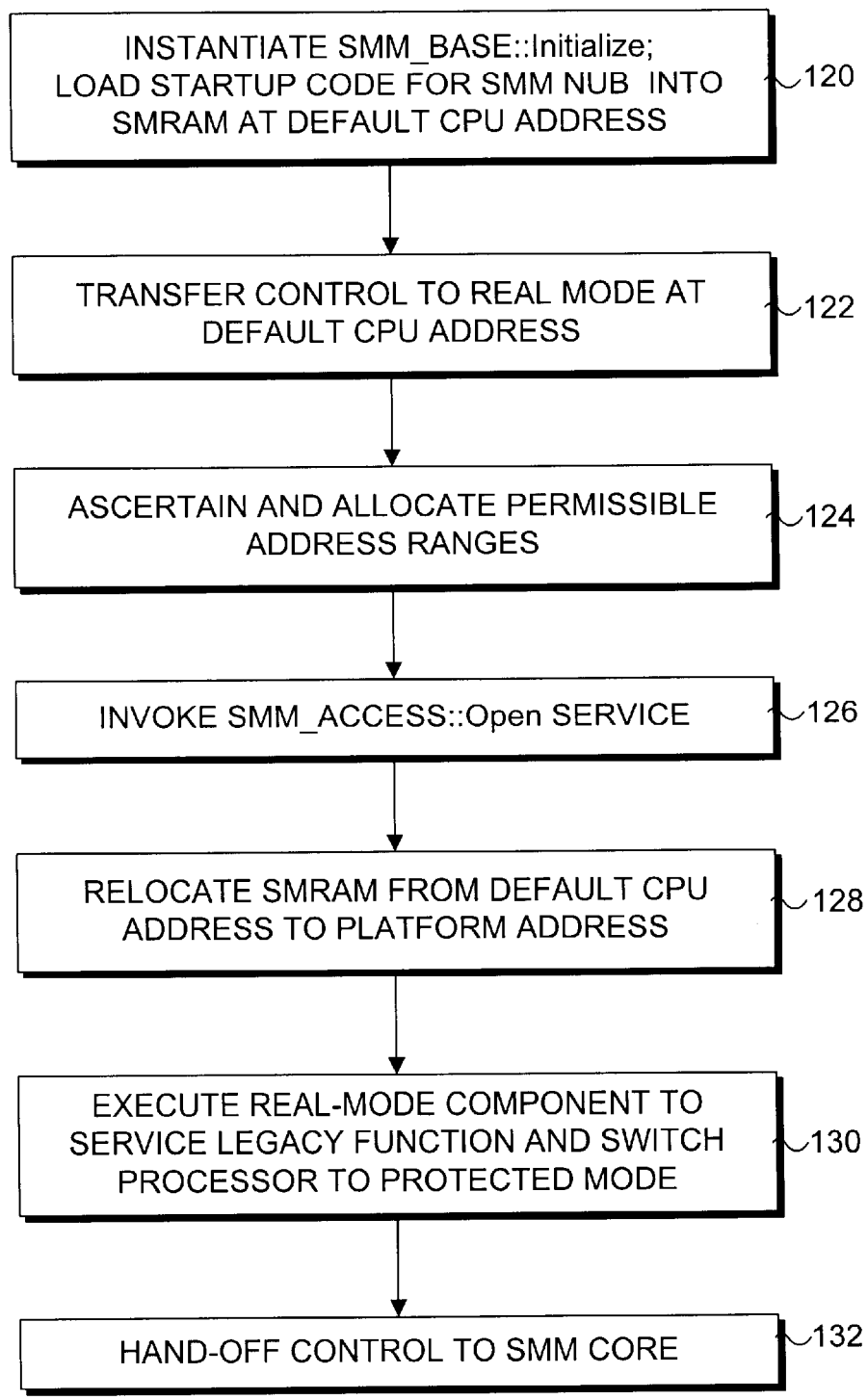
FIG. 6 is a flowchart illustrating the logic used by the present invention when loading and launching execution of an System Management Mode (SMM) Nub that is used to manage event handling when a processor is operating in SMM.

In order to use event handlers, the EFI SMM base protocol driver must first be installed. With reference to FIG. 6, the EFI SMM base protocol driver (SMM_BASE) for IA32 processors is installed through the following process. First, an SMM_BASE::Initialize service is called in a block 120. This is implemented with a DXE (Driver Execution Environment) Boot-Service driver that loads and exports this constructor.

In response to instantiating the driver, the startup code for SMM Nub 24 is loaded into SRAM at the CPU default SMRAM address (0x 3000-segment, offset 0x 8000) while operating in protected mode. The processor mode is then transferred to real-mode at the execution address 0x 38000p in a block 122. Next, in a block 124, the permissible address ranges for the platform's SMRAM implementation is ascertained and allocated. This information may be obtained by calling the SMM_ACCESS::GetCapabilities and SMM_ACCESS::AcquireSmramRange methods with the SMM_BASE::Initialize driver, as described below. If this driver doesn't exist, then the default policy will be 0xA000-seg for IA32 processors (or top-of-memory for T-SEG and near 4 GB for H-SEG chipset implementations) and runtime-data for Itanium™ processors, with a default size of (128 Kbyte for IA32 A-segment and 256 Kbyte for Itanium™).

After the address range has been allocated, the SMM_ACCESS::Open service is invoked in a block 126 and the initial address for the SMRAM is relocated from the default CPU address (0x 38000p) to the platform address in a block 128 for IA32. The relocated code will include a real-mode component and a protected mode component. The real-mode component will comprise the SMMEntry into the SMRAM relocation address. In a block 130, this code is executed to perform any legacy services, as necessary, and switch the processor to protected mode operation. Control is then handed off the SMM core in a block 132.

Figure 7:
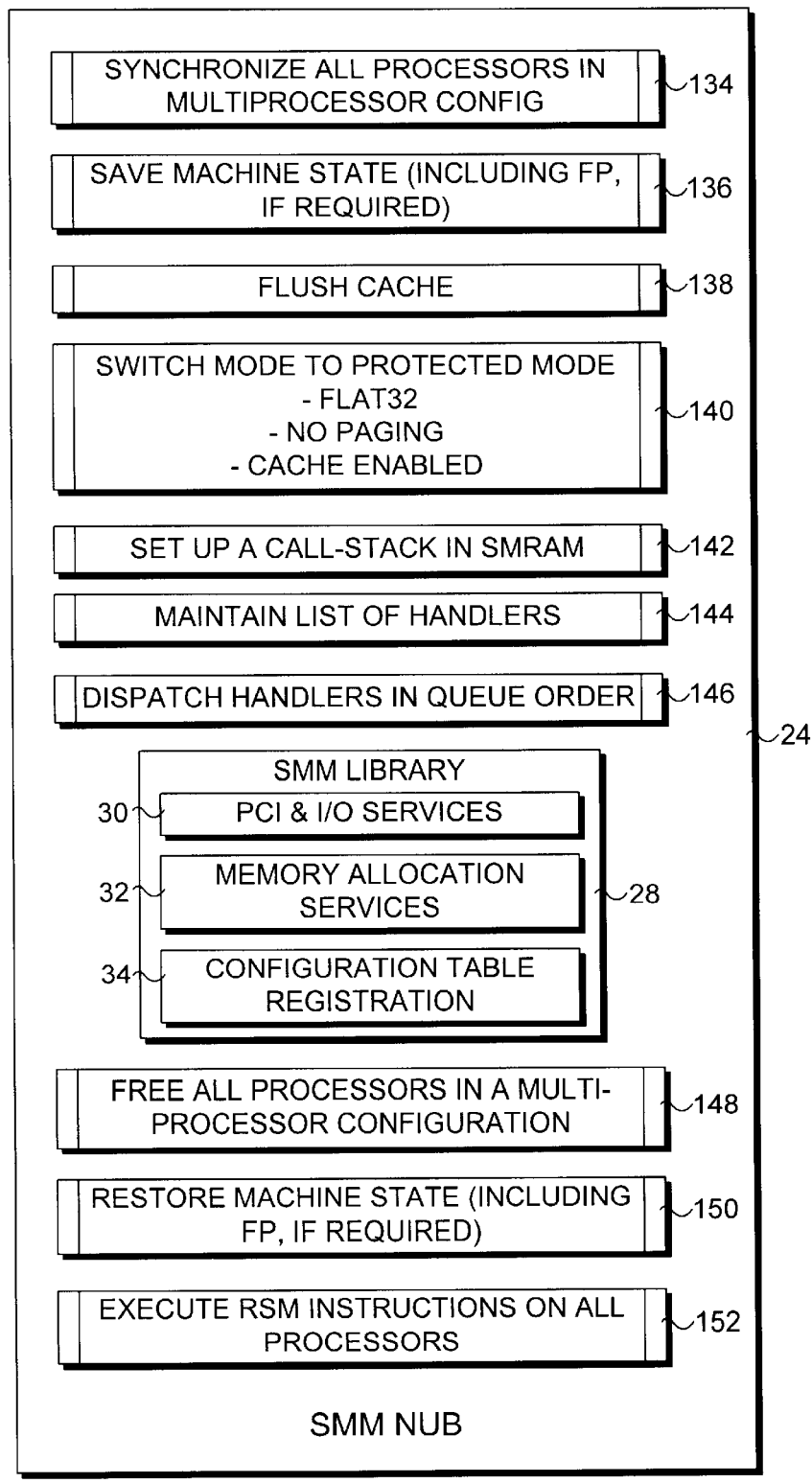
FIG. 7 is a block diagram illustrating various function and service components of the SMM Nub.

As discussed above, SMM Nub 24 is responsible for coordinating activities while the processors are operating in SMM. The various functions and services provided by one embodiment of SMM Nub 24 are graphically depicted in FIG. 7. These functions and services include synchronizing all of the processors for multiprocessor configurations, saving the machine state, including floating point registers, if required, and flushing the cache, as provided by function blocks 134, 136, and 138. The SMM Nub also provides a mode switching function 140 that switches the processor mode from real mode to protected mode, as discussed above with reference to block 130. Mode switching function 140 also enables the processor's internal cache. Other functions provided by SMM Nub 24 include setting up a call-stack in SMRAM 26, maintaining list of handlers 46, and maintaining handler queue 48, as depicted by function blocks 142, 144, and 146.

SMM Nub 24 provides a set of services to the various event handlers through SMM library 28, including PCI and I/O services 30, memory allocation services 32, and configuration table registration services 34. In addition, SMM Nub 24 provides several functions that are performed after the xMI event is serviced. If the computer system implements a multiprocessor configuration, these processors are freed by a function 148. A function 150 restores the machine state of the processor(s), including floating point registers, if required. Finally, a function 152 is used to execute RMS instructions on all of the processors in a system.

As discussed above, the invention provides two mechanisms for loading event handlers: (1) driver-based installation; and (2) autonomous load from the firmware volumes.

For driver-based installations, the SMM_BASE protocol shall be installed by a driver that is loaded by the DXE dispatcher. After the SMM_BASE protocol is installed, it publishes an interface that enables event handlers to be registered and loaded. The protocol for registration is described by the EFI1.0 specification, which defines a mechanism for publishing new callable interfaces in the EFI environment. The SMM_BASE protocol publication essentially comprises exposing the API described in the SMM-CIS (the SMM "Component Interface Interface Specification," or EFI2.0 document describing the EFI2.0 Protocol or API set that abstracts this registration mechanism in the pre-boot space) with the EFI core. The EFI core maintains a protocol database of GUID/interface pointer pairs. The GUID comprises a 128-bit globally-unique ID of the interface.

Through this mechanism, any driver that wishes to install event handlers, wherein in one embodiment an event handler is some code that can be PE32+binary in the IA32 or Itanium™ instruction set, or legacy 16-bit handlers for IA32, can use the standard mechanism of EFI1.0 to discover the SMM_BASE protocol instance (via the core service "LocateProtocol") or register a notification with the EFI core to be alerted when the SMM_BASE protocol is installed. In either case, once the SMM_BASE protocol is installed, various drivers can marshall the interface pointer to the SMM_BASE instance (via the EFI1.0 "HandleProtocol service") and then invoke the SMM_BASE::Register service. The binary code that the driver consuming the SMM_BASE service uses can be ascertaining from its own driver image, a file from disk or network. The file can be in the firmware volume or on the FAT disk partition.

Figure 8:
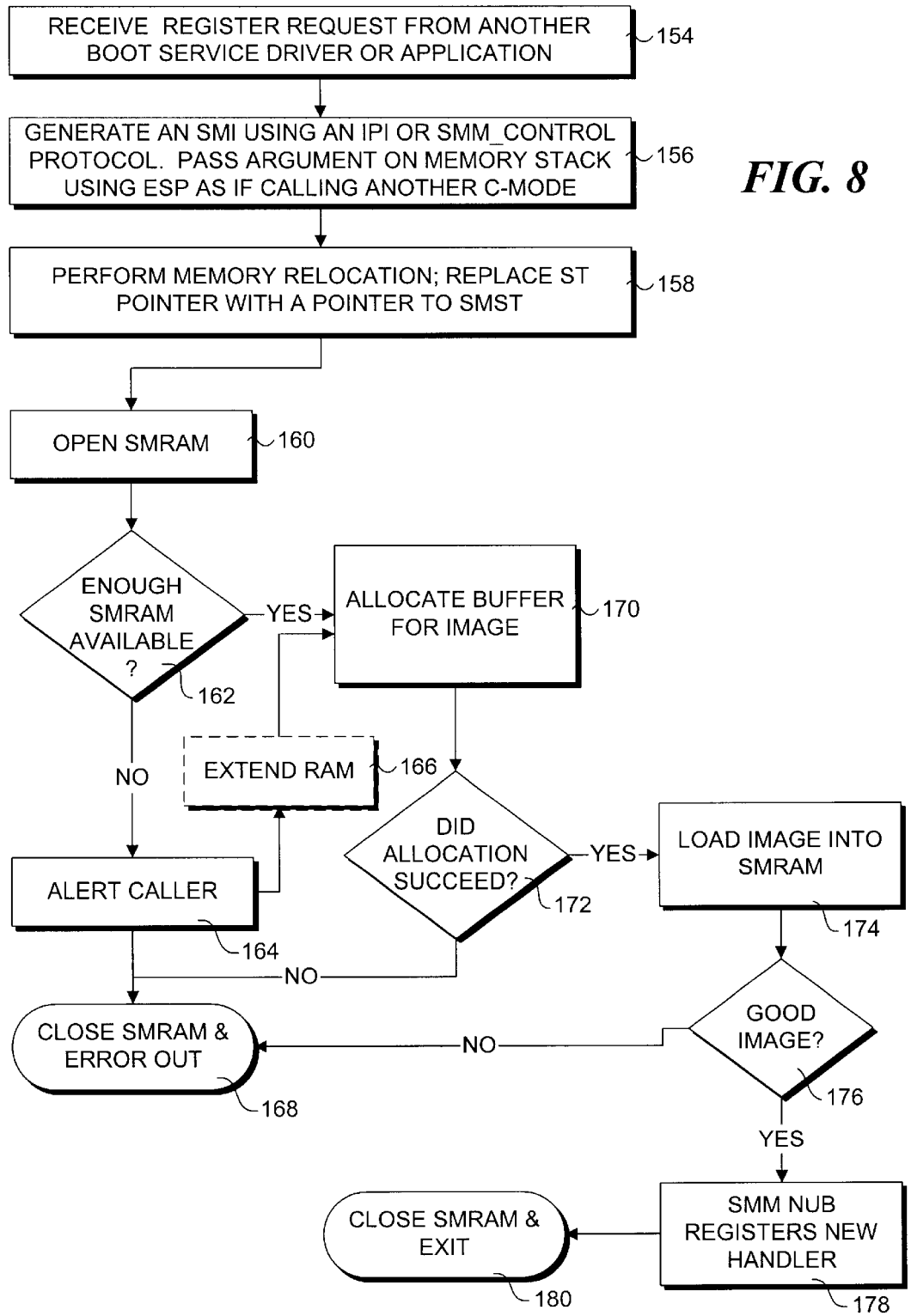
FIG. 8 is a flowchart illustrating the logic used by the invention when registering an event handler.

Registration of event handlers is further facilitated by an SMM_BASE::Register service. This service comprises a DXE Boot-Service driver that permits registration of an event handler. With reference to FIG. 8, the process for registering an event handler begins in a block 154, wherein a request to register an event handler is received by the SMM_BASE protocol driver from another boot service driver or application (i.e., drivers 1–7). In response, an SMI is generated in a block 156, using an IPI or SMM_CONTROL protocol. The argument is passed on the memory stack using the ESP memory stack pointer as if calling another handler. The handlers can be written in C and the generated image PE32+. Next, in a block 158, memory relocation is performed and the ST (System Table from EFI1.0) pointer is replaced with a pointer to the SMST (System Management System Table).

Next, the SMRAM is opened in a block 160 using the SMM_ACCESS::Open service, which is access through the SMM_ACCESS protocol. Further details of SMM_ACCESS protocol are provided in the APPENDIX that follows. The SMM_ACCESS::Open service abstracts programming of the memory controller to enable visibility of the SMRAM from non-SMRAM based code. This enables the SMM_BASE protocol to copy and install code, such as the SMM Nub, into SMRAM.

Next, in a decision block 162 a determination is made to whether enough SMRAM is available to hold the event handler routine. If not enough SMRAM memory space is available, the logic proceeds to a block 164 in which the caller is alerted. As an option, in response to being alerted, the caller may use the SMM_ACCESS::GetCapabilities and SMM_ACCESS::AcquireSmramRange method to acquire additional memory space within the SMRAM, as provided by a block 166. If there is not enough SMRAM memory space available, the SMRAM is closed by calling the SMM_ACCESS::Close method and an error code is returned to the caller in an error return block 168.

If it is determined that there is enough SMRAM memory space available, a memory buffer for the SMRAM image of the handler is allocated in a block 170. A determination to whether the allocation succeeded is made in a decision block 172. If the allocation wasn't successful, the logic proceeds to error return block 168. If the allocation is successful, an image of the event handler is loaded into the SMRAM memory space that had been previously allocated in a block 174. A determination is then made to whether the image is good in a decision block 176. If not, the logic proceeds to error return block 168. If the image is verified to be good, SMM Nub 24 registers the new event handler by adding it its list of handlers 46 in a block 178, and the SMRAM is closed and the process returns to the caller in a return block 180.

The mechanism for autonomously loading event handlers from firmware volumes does not rely on having another driver consume the SMM_BASE interface and SMM_BASE::Register service. Rather than have drivers initiate the registration process, the various firmware volumes (FV) that are materialized during the pre-boot are scanned for suitable driver files that contain event handlers that may be loaded by the SMM_BASE driver.

A firmware volume is a collection of firmware files. Each firmware file in the firmware volume has a TYPE field among other metadata in a firmware file header. Included among the enumeration of type fields within a firmware file header is a new TYPE called "SmmHandler." Understanding of the firmware volume and firmware file system ReadFile services and this new type shall be known by all drivers that implement and publish the SMM_BASE interface.

Figure 9:
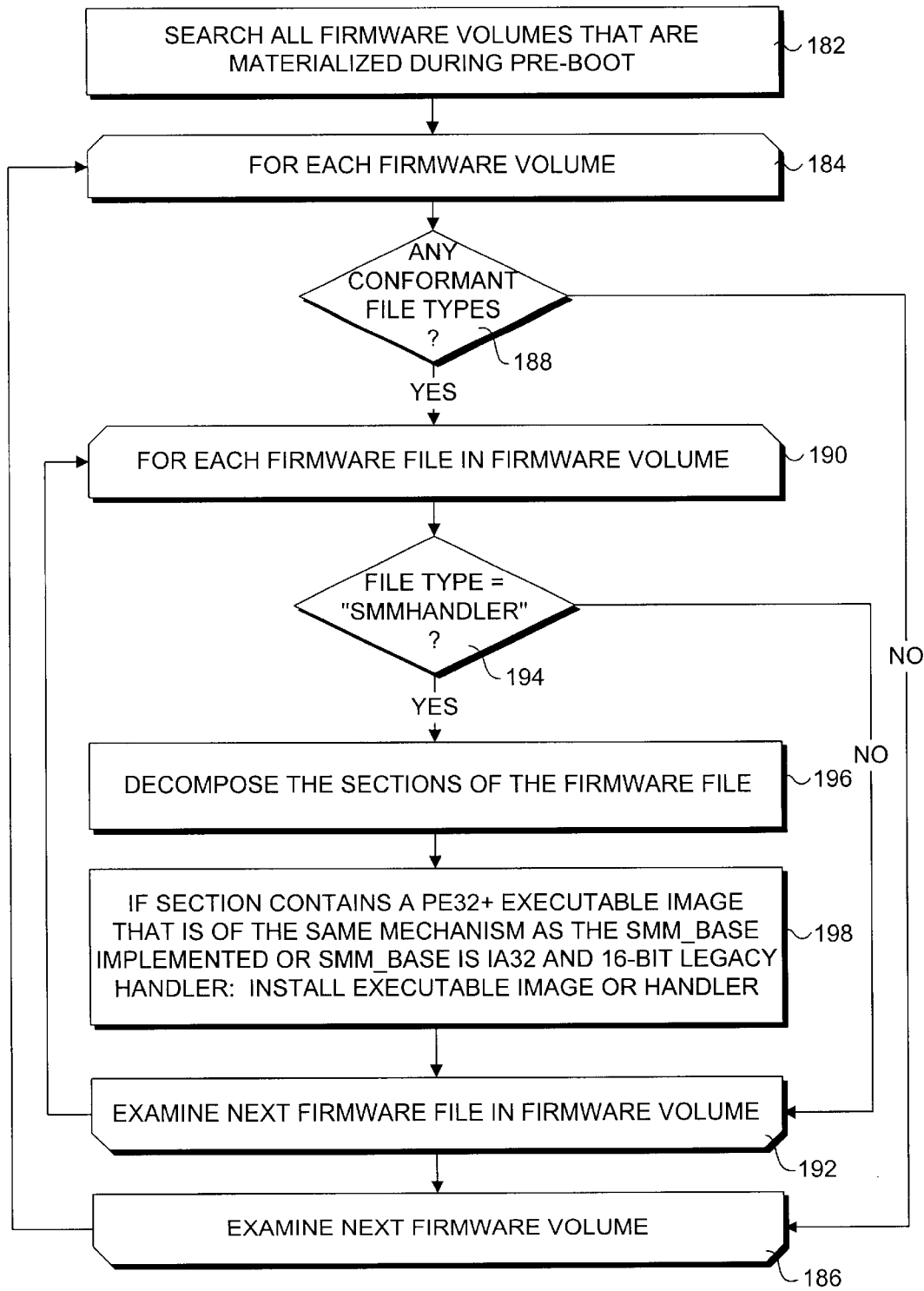
FIG. 9 is a flowchart illustrating the logic used by the invention when registering and installing event handlers that are stored in firmware volumes that are scanned during a pre-boot process.

With reference to FIG. 9, the mechanism begins in a block 182, wherein the SMM_BASE driver searches all firmware volumes that are materialized in the system during pre-boot. As defined by start and end loop blocks 184 and 186, the following logic is applied to each of these firmware volumes. In a decision block 188 a determination is made to whether the firmware volume contains any firmware files conformant with the firmware file system. If the answer is no, the logic loops back to examine the next firmware volume. If one or more conformant firmware files are found, each of these files are examined using the following process, as defined by start and end loop blocks 190 and 192. In a decision block 194, the SMM_BASE drive examines the file type of the current file to determine with it is an "SMMHandler" file. If it is not, the logic loops back to begin examination of the next file. If the file type is "SmmHandler," the SMM_BASE driver decomposes the Sections of the firmware file in a block 196; a section is the internal packing mechanism within a firmware file. As provided by a block 198, if a section contains a PE32+ executable image, wherein PE32+ is a Portable Executable image type described by Microsoft in the Portable Image specification (posted on the Internet at "www.microsoft.com/hwdev/efi") that is of the same machine type as which the SMM_BASE is implemented (e.g., the computer system is an IA32 machine and the handler is an IA32 PE32+ image) or if the SMM_BASE implementation is on an IA32 system that supports loading legacy 16-bit handlers, the SMM_BASE driver shall install the executable image or legacy 16-bit handler contained in the section. The logic then proceeds to process subsequent firmware files and firmware volumes in a similar manner.

In general, the SMM_BASE shall assume that arguments presented above for the SMM_BASE::Register will have default values, such as floating-point save and MakeFirst==FALSE, when loading the handler autonomously from a Firmware File.

In general, the handling of an SMI with an IA-32 processor and a PMI with an Itanium-class processor encompasses similar processes. However, there are some differences. A primary difference between is that the Itanium™ processors do not have a special CPU mode entered upon activation of its xMI signal. Rather, Itanium™ processors only provide a mechanism to bind a handler into the processor to handle a PMI event. This binding is affected via a registration call into the Processor Abstraction Layer (PAL), which is firmware provided by Intel for all Itanium platform builders, and comprises part of the Itanium architecture that is used to provide a consistent firmware interface to abstract processor implementation-specific features.

Figure 10:
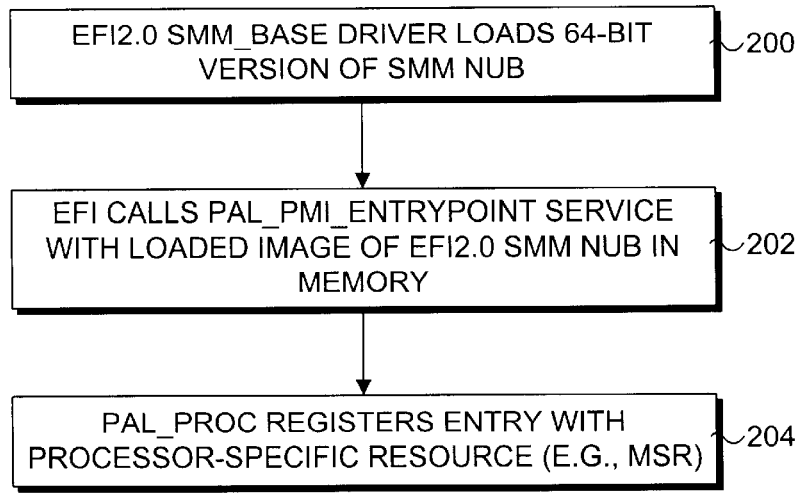
FIG. 10 is a flowchart illustrating operations performed by the invention when registering event handler for servicing processor management interrupt (PMI) event with an Itanium™ processor.

Details of registering a handler and handling a PMI event with an Itanium™ processor are shown in FIGS. 10 and 11. The registration process begins in a block 200, in which the EFI2.0 SMM_BASE driver loads a 64-bit version of the SMM Nub. Upon loading the SMM Nub, the EFI calls the PAL_PMI_ENTRYPOINT service with the loaded image of the Nub in memory in a block 202, which creates an entry point into the Nub code.

During initialization, the PAL publishes a set of services called PAL_PROCS. One of these PAL_PROCS is then used to register the entrypoint with an appropriate processor-specific resource, such as the processor's model-specific registers (MSR), in a block 204. Registration of the entrypoint thereby creates a binding between the processor and the set of PMI event handlers that are accessed via the SMM Nub.

Figure 11A:
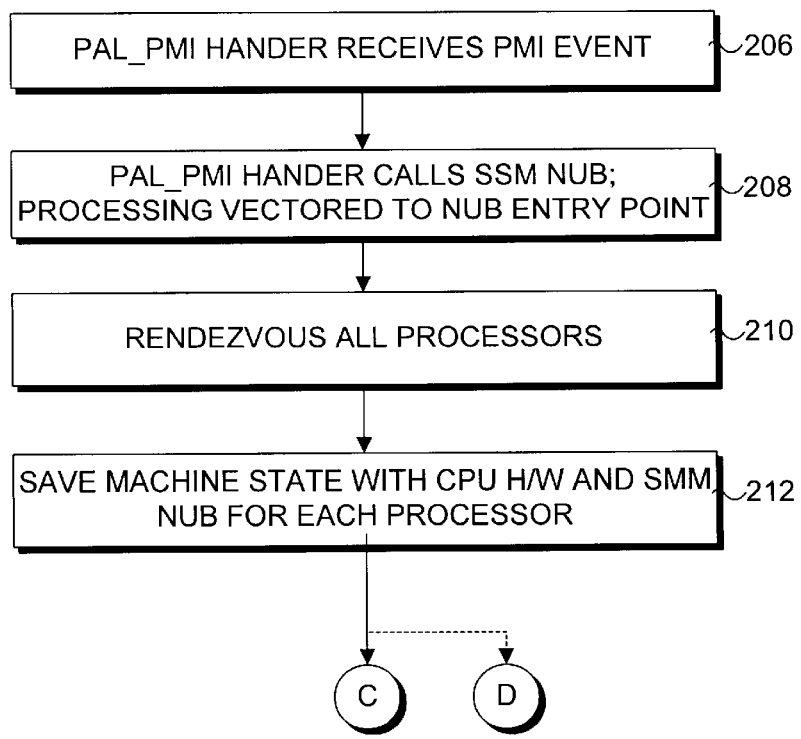
FIG. 11A comprises a first portion of a flowchart illustrating the logic used by the present invention when handling a PMI event.

With reference to FIG. 11A, PMI event handling may then be performed as follows. In a block 206, a PAL_PMI event handler receives a PMI event. The PAL_PMI event handler then calls SMM Nub 24 in a block 208, which causes the processing of a processor that is selected to perform extensible PMI event handling to be vectored to the Nub entry point that was registered above. Next, all of the processors are rendezvoused in a block 210, whereby all but a selected processor (e.g., the first processor that is identified during the pre-boot process) are halted while the SMM Nub in the selected processor is executed. The machine state of each CPU is then saved by both the CPU hardware and the SMM Nub 24 in a block 212.

Figure 11B:
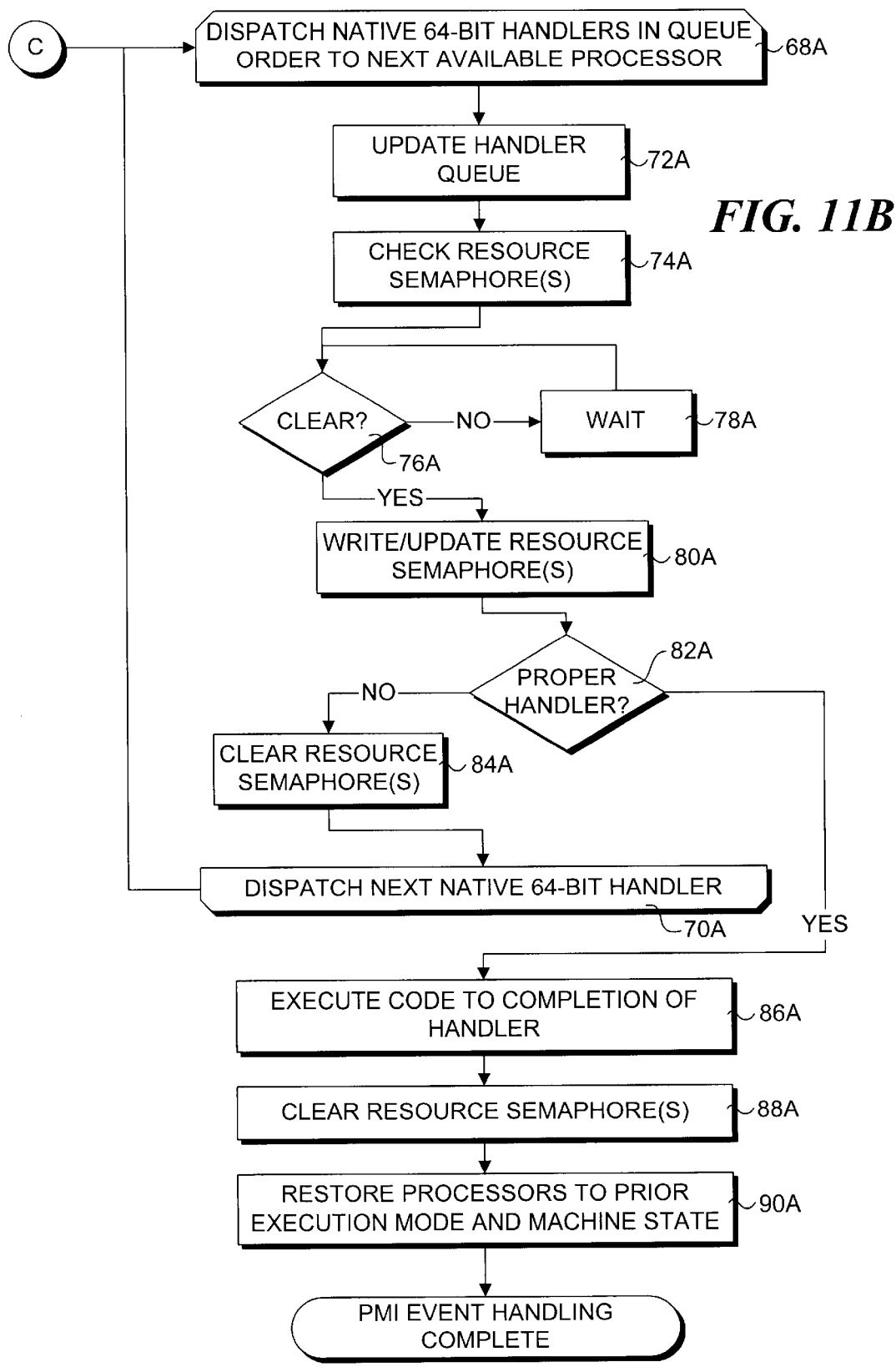
FIG. 11B comprises a second portion of the flowchart of FIG. 11A illustrating the logic used by the invention in accordance with an embodiment in which a plurality of event handlers are dispatched to multiple processors and checked to see if they are appropriate for handling the PMI event.

In one embodiment, in accordance with FIG. 11B, once the machine states of the processors have been saved, native 64-bit handlers are dispatched in handler queue order to a next available processor until an appropriate event handler is executed to completion to service the PMI event, as provided by start loop and end loop blocks 68A and 70A. In this embodiment, the operations performed in blocks 68A, 70A, 72A, 74A, 76A, 78A, 80A, 82A, 84A, 88A, and 90A mirror the operations performed by the blocks shown in FIG. 2B that share the same root reference number except that in this instance 64-bit handlers are dispatched and executed instead of 32-bit handlers. For example, handler queue 48 is updated in a block 72A upon dispatch of each handler in a manner similar to the updating of handler queue 48 discussed above with reference to block 72 in FIG. 2B. Upon acknowledgment of the PMI event being handled, SMM Nub restores the machine state and executes an appropriate instruction (RSM on IA32 and return on b0 for IPF) for the processor/all processors to return the processor(s) to its/their previous processing mode in a block 90A.

In another embodiment shown in FIG. 11C, multiple event handlers are dispatched to available processors and executed to completion in a manner similar to that discussed above with reference to FIG. 2C, wherein similar operations are performed in blocks having reference numbers with common roots. In addition to the embodiments, PMI event handling may also include dispatch and execution of concurrent event handlers in a manner similar to that described above with reference to FIGS. 4B and 5.

The frame also provides for servicing interrupts while in SMM mode. In addition to dispatching handlers in the synchronous fashion in response to the SMI or PMI activation described above, a mechanism is provided for period activation of handlers. This is supported, in part, by means of a software xMI Timer Service Handler. The service handler can program a platform resource to engender a periodic activation of the SMI/PMI with some given time interval. The associated handler can also publish this capability to other peer handlers that want to be listeners or agents to respond to these periodic events. As such, a GUID-based service from the software xMI Timer Service Handler may be used by other handlers and allow them to be invoked on a time-sliced basis. The framework also provides a service for canceling the periodic activation.

An exemplary use for this periodic service capability concerns software memory scrubbing handlers. Memory scrubbing is often used to correct memory errors, and involves reading memory and writing back to it. Generally, this duty is automatically handled via a system's chipset (e.g., memory controller) and/or built-in functionality provided by a memory component (e.g., a DRAM DIMM). However, in some instances in which the memory controller or built-in functionality is less sophisticated, this task must be performed by software through a service handler. For example, assume that a given chipset is only able to report a SBE (Single-Bit Error) at a DRAM bank level, and the bank could be up to one-gigabyte in size. If the SMI or PMI handler were to attempt the software scrub the memory during a single activation, the read/write access to each of the one-billion memory locations would have an extended latency, especially since the access needs to be a write-back to actual DRAM. This loss of foreground operating system control would likely have adverse effects on the operating system, at least causing an apparent system "freeze" and possibly crashing the OS. As such, one solution would be for the memory scrubbing handlers to use the parallel dispatch mechanism of the invention described above to do phased concurrent memory scrubbing, wherein the handlers are executed in phases such that only a portion of the memory scrubbing is handled during each phase (e.g., 10 MB or 100 MB chunks). For instance, in one embodiment the handlers would invoke the xMI Timer Handler to request activation on successive intervals, (e.g., 100 ms, 1 second, etc.) wherein a predefined chunk of memory is scrubbed during each interval until all of the memory has been scrubbed.

Exemplary Machine for Implementing the Invention

Figure 12:
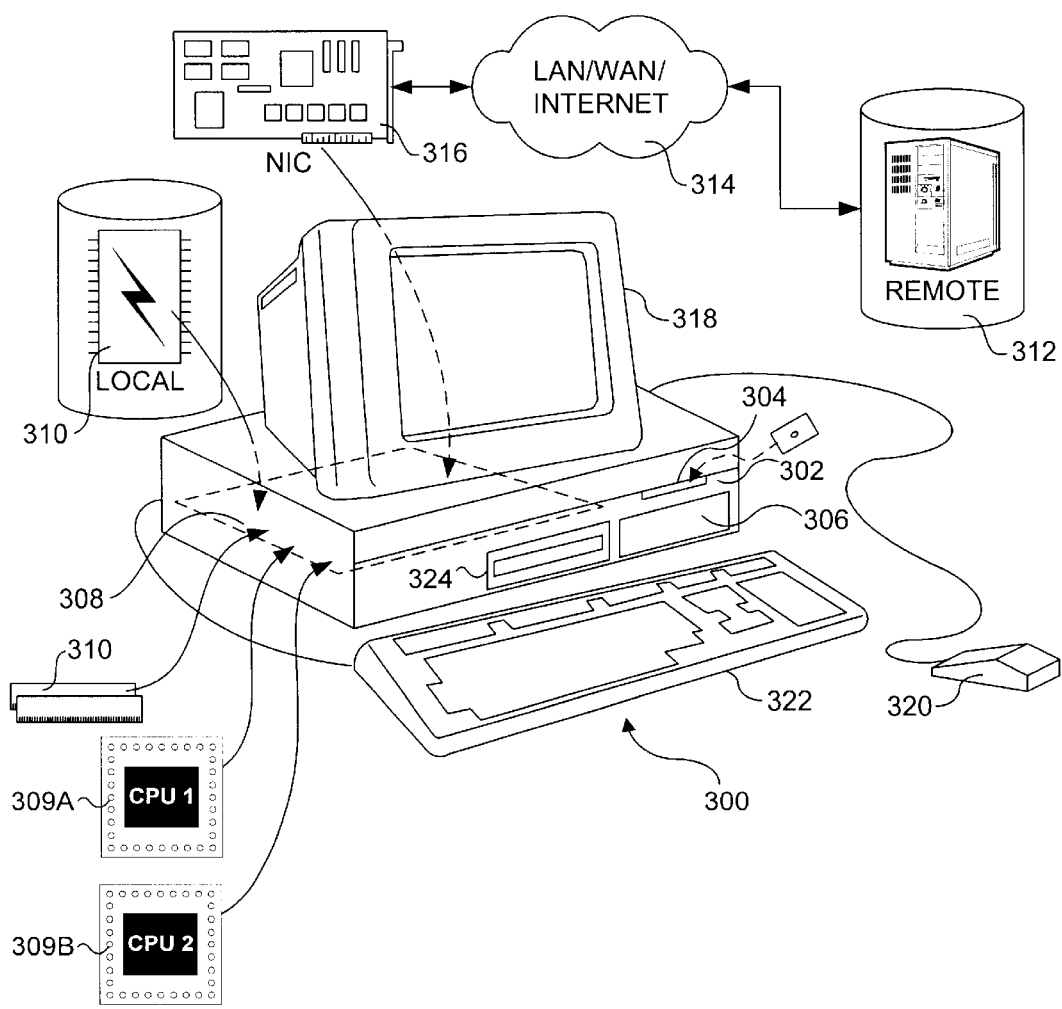
FIG. 12 is a schematic diagram of a multiprocessor computer system suitable for implementing the present invention.

With reference to FIG. 12, a generally conventional multiprocessor computer system 300 is illustrated, which is suitable for use in connection with practicing the present invention. Multiprocessor computer system 300 includes a processor chassis 302 in which are mounted a floppy disk drive 304, a hard drive 306, a motherboard 308 populated with appropriate integrated circuits including a plurality of processors (depicted as processors 309A and 309B), one or more memory modules 310, and a power supply (not shown), as are generally well known to those of ordinary skill in the art. Motherboard 308 also includes a local firmware storage device 311 (e.g., flash EPROM—Eraseable Programmable Read-Only Memory) on which the base portion of the BIOS firmware is stored. To facilitate access to the portion of the BIOS firmware that is retrieved from a remote firmware storage device 312 via a network 314, personal computer 300 includes a network interface card 316 or equivalent circuitry built into motherboard 308. Network 314 may comprise a LAN, WAN, and/or the Internet, and may provide a wired or wireless connection between personal computer 300 and remote firmware storage device 312.

A monitor 318 is included for displaying graphics and text generated by software programs that are run by the personal computer and which may generally be displayed during the POST (Power-On Self Test) and other aspect of firmware load/execution. A mouse 320 (or other pointing device) is connected to a serial port (or to a bus port) on the rear of processor chassis 302, and signals from mouse 320 are conveyed to motherboard 308 to control a cursor on the display and to select text, menu options, and graphic components displayed on monitor 318 by software programs executing on the personal computer. In addition, a keyboard 322 is coupled to the motherboard for user entry of text and commands that affect the running of software programs executing on the personal computer.

Personal computer 300 also optionally includes a compact disk-read only memory (CD-ROM) drive 324 into which a CD-ROM disk may be inserted so that executable files and data on the disk can be read for transfer into the memory and/or into storage on hard drive 306 of personal computer 300. If the base BIOS firmware is stored on a re-writeable device, such as a flash EPROM, machine instructions for updating the base portion of the BIOS firmware may be stored on a CD-ROM disk or a floppy disk and read and processed by the computer's processor to rewrite the BIOS firmware stored on the flash EPROM. Updateable BIOS firmware may also be loaded via network 314.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

Appendix
SMM_ACCESS Protocol for IA32

The SMM_ACCESS protocol is published by a chipset driver, namely the MCH driver for the 82815 chipset. This driver abstracts the capabilities of the memory controller for opening, closing, and locking SMRAM. It also describes the possible regions for the SMRAM, including the location of the legacy frame buffer at 0xA0000, and memory near the top of the physical DRAM (T-SEG).

The SMM_ACCESS protocol constructor should register a call-back on ExitBootServices. The SMM_ACCESS protocol provides the following functions:

SMM_ACCESS::Open

This service abstracts programming of the memory controller to enable visibility of the SMRAM from non-SMRAM based code. This enables the SMM_BASE protocol to copy and install code, such as the SMM Nub, into SMRAM.

SMM_ACCESS::Close

This service abstracts programming of the memory controller to disable the visibility of the SMRAM from non-SMRAM based code. This enables the SMM_BASE protocol to inhibit other pre-boot agents from viewing the SMRAM-based contents.

SMM_ACCESS::Lock

This service abstracts the hardware capability of securing the SMRAM such that no future attempts can succeed in opening the visibility of this region.

SMM_ACCESS::GetCapabilities

This call provides the caller, which is most likely the SMM_BASE driver, the available regions of memory for use as SMRAM. This is a read-only reporting service that publishes information. The claiming of the region and programming of the chipset to effect the decode of this store in SMRAM is effected by acquiring the region in question (see next service).

SMM_ACCESS::AcquireSmramRange

This service provides two types of functionality. The first is that it is the resource management database visible to the EFI2.0 boot-service caller. The possible ranges of available SMRAM in the platform are published by the GetCapabilities' service SMRAM Map, and a region is the map can be requested for enable by this service. This request minimally includes an update to the driver of ownership, but the call will also entail chipset programming that actually enables the request regime.

SMM ACCESS::ReleaseSmramRange

This service provides two types of functionality. This request minimally includes an update to the driver of releasing ownership of a range, but the call will also entail chipset programming that actually disables the request regime.

What is claimed is:

1. A method for servicing a hidden execution mode event in a multiprocessor computer system, comprising:
   loading a plurality of event handlers into a hidden memory space that is accessible to a hidden execution mode supported by each of a plurality of processors in the multiprocessor computer system but is not accessible to other operating modes of those processors;
   dispatching event handlers from among said plurality of event handlers to different processors from among said plurality of processors in response to the hidden execution mode event; and
   concurrently executing the event handlers that are dispatched on the different processors to service the hidden execution mode event.

2. The method of claim 1, wherein the hidden execution mode comprises a System Management Mode (SMM) of a microprocessor, and the hidden execution mode event comprises a System Management Interrupt (SMI) event.

3. The method of claim 1, wherein the hidden execution mode event comprises a Processor Management Interrupt (PMI) event.

4. The method of claim 1, further comprising:
   creating a handler queue comprising an ordered list of said plurality of event handlers;
   dispatching event handlers to a next available processor for execution based on a relative position of each event handler in the ordered list.

5. The method of claim 1, further comprising:
   dispatching a first set of event handlers to respective processors from among said plurality of processors;
   for each event handler that is dispatched, determining if that handler is an appropriate event handler for servicing the hidden execution mode event and, if it is, executing that event handler to completion to service the hidden execution mode event; otherwise
   stopping execution of any event handler that is determined to not be an appropriate event handler; and
   dispatching a next event handler in the list to a next available processor and determining whether that event handler is an appropriate event handler and repeating this operation until an appropriate event handler has been dispatched, whereupon that event handler is executed to completion to service the event.

6. The method of claim 1, further comprising:
   loading an event handler management service into the hidden memory space;
   registering said plurality of event handlers with the event handling management service;
   redirecting an instruction pointer for a selected processor to begin execution of the event handler management service is response to the hidden execution mode event; and
   dispatching event handlers from among said plurality of an event handlers via the event handler management service to at least two different processors to service the event.

7. The method of claim 1, further comprising:
   providing a resource locking mechanism that enables a specified resource to be accessed by only one event handler at a time.

8. The method of claim 1, wherein the hidden execution mode event is generated by a system resource that supports concurrent access, and wherein a plurality of event handlers instances or event handler code portion instances are dispatched to said plurality of processors and executed concurrently to service the hidden execution mode event.

9. The method of claim 5, wherein each of said plurality of event handlers comprise a set of machine code that is executed by the processor to service an error condition generated by a hardware component in the computer system that causes the hidden execution mode event, and determining whether an event handler is an appropriate event handler for servicing the hidden execution mode event comprises:
   executing a first portion of the set of machine code corresponding to a dispatched event handler that queries the hardware component corresponding to that event handler to determine if the error condition was caused by that hardware component; and
   completing execution of the set of machine code for the event handler if it is determined that the error condition was caused by its corresponding hardware component, otherwise returning a value to a calling software component indicating that the event handler is not the appropriate event handler to service the error condition.

10. The method of claim 6, further comprising:
saving information pertaining to a processing mode and machine state for each processor in the multiprocessor computer system prior to executing an event handler on that processor; and
returning each processor to its previous processing mode and machine state to resume execution of its respective operation after the event has been serviced by (an) appropriate event handler(s).

11. The method of claim 7, wherein the resource locking mechanism comprises the use of one or more semaphores.

12. The method of claim 7, further comprising:
storing resource lock information corresponding to one or more resources accessed by any event handlers that has been dispatched;
checking resource lock information corresponding to a given resource or set of resources prior to execution of any code portion of an event handler that accesses that resource or set of resources to verify that resource or set of resources are available for access; and
waiting for any resource locks corresponding to that resource or set of resources to be cleared prior to executing the code portion of the event handler.

13. The method of claim 8, wherein said plurality of event handlers instances or event handler code portion instances are dispatched repeatedly using a timer-based mechanism to service the hidden execution mode event in phases.

14. A method for servicing a System Management Interrupt (SMI) event in a multiprocessor computer system, comprising:
loading a plurality of event handlers into System Management Mode (SMM) memory (SMRAM) that is accessible to a plurality of processors in the multiprocessor computer system when those processors are executing in a SMM;
switching said plurality of processors to SMM in response to the SMI event event;
dispatching event handlers from among said plurality of event handlers to different processors from among said plurality of processors; and
concurrently executing the event handlers that are dispatched on the different processors to service the SMI event.

15. The method of claim 14, further comprising:
loading an event handler management service into SMRAM;
registering said plurality of event handlers with the event handling management service;
redirecting an instruction pointer for a selected processor to begin execution of the event handler management service is response to the SMI event; and
dispatching the event handlers via the event handler management service to service the SMI event.

16. The method of claim 14, further comprising:
storing resource lock information corresponding to one or more resources accessed by any event handlers that has been dispatched;
checking resource lock information corresponding to a given resource or set of resources prior to execution of any code portion of an event handler that accesses that resource or set of resources to verify that resource or set of resources are available for access; and
waiting for any resource locks corresponding to that resource or set of resources to be cleared prior to executing the code portion of the event handler.

17. The method of claim 14, wherein the SMI event is generated by a system resource that supports concurrent access, and wherein a plurality of event handlers instances or event handler code portion instances are dispatched to said plurality of processors and executed concurrently to service the SMI event.

18. The method of claim 15, further comprising:
maintaining a handler queue via the event handler management service in which an ordered list of event handlers are stored;
dispatching event handlers to a next available processor for execution based on a relative position of each event handler in the ordered list.

19. The method of claim 17, wherein said plurality of event handlers instances or event handler code portion instances are dispatched repeatedly using a timer-based mechanism to service the SMI event in phases.

20. A method for handling a Platform Management Interrupt (PMI) event in a multiprocessor computer system, comprising:
loading a PMI event-handling management service into memory accessible to a plurality of processors in the multiprocessor computer system;
registering an entry point for the PMI event-handling management service;
enabling a plurality of PMI event handlers to be made accessible to the processor via the PMI event-handling management service; and
in response to the PMI event, vectoring a selected processor to begin executing the PMI event-handling management service at its entry point to effect the operations of:
dispatching at least two of said plurality of PMI event handlers to different processors among said plurality of processors; and
executing said at least two PMI event handlers on the different processors to service the PMI event.

21. The method of claim 20, wherein the said plurality of event handlers are made accessible to the PMI event-handling management service by publishing a registration interface that enables registration of PMI event handlers with the PMI event-handling management service.

22. The method of claim 20, further comprising:
storing resource lock information corresponding to one or more resources accessed by any event handlers that has been dispatched;
checking resource lock information corresponding to a given resource or set of resources prior to execution of any code portion of an event handler that accesses that resource or set of resources to verify that resource or set of resources are available for access; and
waiting for any resource locks corresponding to that resource or set of resources to be cleared prior to executing the code portion of the event handler.

23. The method of claim 20, wherein the PMI event is generated by a system resource that supports concurrent access, and wherein a plurality of event handlers instances or event handler code portion instances are dispatched to said plurality of processors and executed concurrently to service the PMI event.

24. The method of claim 21, wherein a plurality of event handlers are registered with the PMI event handling management service, further comprising:

maintaining a handler queue via the event handler management service in which an ordered list of event handlers are stored;

dispatching event handlers to a next available processor for execution based on a relative position of each event handler in the ordered list.

25. The method of claim 23, wherein said plurality of event handlers instances or event handler code portion instances are dispatched repeatedly using a timer-based mechanism to service the PMI event in phases.

26. A machine-readable medium having a plurality of machine instructions stored thereon that when executed by a processor in a multiprocessor computer system performs the operations of:

loading a plurality of event handlers into a hidden memory space that is accessible to a hidden execution mode supported by each of a plurality of processors in the multiprocessor computer system but is not accessible to other operating modes of those processors;

dispatching event handlers from among said plurality of event handlers to selected processors from among a plurality of processors running in the multiprocessor computer system in response to the hidden execution mode event so that the event handlers can be concurrently executed on the selected processors to service the hidden execution mode event.

27. The machine-readable medium of claim 26, wherein execution of said plurality of machine instructions further performs the operations of:

dispatching a first set of event handlers to the selected processors, each processor being dispatched a respective event handler in the first set of event handlers;

for each event handler that is dispatched, determining if that handler is an appropriate event handler for servicing the hidden execution mode event and, if it is, executing that event handler to completion to service the hidden execution mode event; otherwise stopping execution of any event handler that is determined to not be an appropriate event handler; and dispatching a next event handler in the list to a next available processor and determining whether that event handler is an appropriate event handler and repeating this operation until an appropriate event handler has been dispatched, whereupon that event handler is executed to completion to service the event.

28. The machine-readable medium of claim 26, wherein the hidden execution mode event is generated by a system resource that supports concurrent access, and wherein a plurality of event handlers instances or event handler code portion instances are dispatched to the selected processors and executed concurrently to service the hidden execution mode event.

29. The machine-readable medium of claim 26, wherein execution of said plurality of machine instructions further performs the operations of:

providing a resource locking mechanism that enables a specified resource to be accessed by only one event handler at a time;

storing resource lock information corresponding to one or more resources accessed by any event handlers that has been dispatched;

checking resource lock information corresponding to a given resource or set of resources prior to execution of any code portion of an event handler that accesses that resource or set of resources to verify that resource or set of resources are available for access; and waiting for any resource locks corresponding to that resource or set of resources to be cleared prior to executing the code portion of the event handler.

30. The method of claim 28, wherein said plurality of event handlers instances or event handler code portion instances are dispatched repeatedly using a timer-based mechanism to service the hidden execution mode event in phases.

31. A multiprocessor computer system comprising:

a motherboard;

a memory operatively coupled to the motherboard in which a plurality of machine instructions are stored; and a plurality of processors operatively coupled to the motherboard and linked in communication with the memory, to execute the machine instructions to perform the operation of:

loading a plurality of event handlers into a hidden memory space that is accessible to a hidden execution mode supported by each of a plurality of processors in the multiprocessor computer system but is not accessible to other operating modes of those processors;

dispatching event handlers from among said plurality of event handlers to selected processors from among said plurality of processors running in the multiprocessor computer system in response to the hidden execution mode event so that the event handlers can be concurrently executed on the selected processors to service the hidden execution mode event.

32. The multiprocessor computer system of claim 31, wherein execution of said plurality of machine instructions by said plurality of processors further performs the operations of:

dispatching a first set of event handlers to the selected processors, each processor being dispatched a respective event handler in the first set of event handlers;

for each event handler that is dispatched, determining if that handler is an appropriate event handler for servicing the hidden execution mode event and, if it is, executing that event handler to completion to service the hidden execution mode event; otherwise stopping execution of any event handler that is determined to not be an appropriate event handler; and dispatching a next event handler in the list to a next available processor and determining whether that event handler is an appropriate event handler and repeating this operation until an appropriate event handler has been dispatched, whereupon that event handler is executed to completion to service the event.

33. The multiprocessor computer system of claim 31, wherein the hidden execution mode event is generated by a system resource that supports concurrent access, and wherein a plurality of event handlers instances or event handler code portion instances are dispatched to the selected processors and executed concurrently to service the hidden execution mode event.

34. The multiprocessor computer system of claim 31, wherein execution of said plurality of machine instructions by said plurality of processors further performs the operations of:

providing a resource locking mechanism that enables a specified resource to be accessed by only one event handler at a time;

storing resource lock information corresponding to one or more resources accessed by any event handlers that has been dispatched;

checking resource lock information corresponding to a given resource or set of resources prior to execution of any code portion of an event handler that accesses that resource or set of resources to verify that resource or set of resources are available for access; and waiting for any resource locks corresponding to that resource or set of resources to be cleared prior to executing the code portion of the event handler.

* * * * *

UNITED STATES PATENT AND TRADEMARK OFFICE
CERTIFICATE OF CORRECTION

PATENT NO.    : 6,775,728 B2
DATED         : August 10, 2004
INVENTOR(S)   : Zimmer et al.

It is certified that error appears in the above-identified patent and that said Letters Patent is hereby corrected as shown below:

Column 9,
Line 16, delete "handier" and insert -- handler --.

Column 17,
Line 48, delete "SMM ACCESS::ReleaseSmramRange" and insert
-- SMM_ACCESS::ReleaseSmramRange --.

Signed and Sealed this

Thirtieth Day of November, 2004

JON W. DUDAS
*Director of the United States Patent and Trademark Office*